United States Patent
Matsumoto

(10) Patent No.: US 7,985,024 B2
(45) Date of Patent: Jul. 26, 2011

(54) ROLLING ELEMENT ACCOMMODATING BELT FOR LINEAR GUIDE APPARATUS, LINEAR GUIDE APPARATUS AND METALLIC MOLD FOR MANUFACTURING ROLLING ELEMENT ACCOMMODATING BELT

(75) Inventor: Jun Matsumoto, Fujisawa (JP)

(73) Assignee: NSK Ltd., Tokyo (JP)

( * ) Notice: Subject to any disclaimer, the term of this patent is extended or adjusted under 35 U.S.C. 154(b) by 1030 days.

(21) Appl. No.: 11/766,394

(22) Filed: Jun. 21, 2007

(65) Prior Publication Data

US 2008/0025653 A1    Jan. 31, 2008

(30) Foreign Application Priority Data

Jun. 21, 2006 (JP) ................. 2006-171278
Jun. 23, 2006 (JP) ................. 2006-174351

(51) Int. Cl.
*F16C 19/00* (2006.01)
*F16C 29/06* (2006.01)
(52) U.S. Cl. ................ 384/51; 384/43; 384/49; 384/54; 29/898.067
(58) Field of Classification Search .............. 384/13, 384/15, 43–45, 49, 51, 54; 29/898.067; 249/105
See application file for complete search history.

(56) References Cited

U.S. PATENT DOCUMENTS

| | | | | |
|---|---|---|---|---|
| 2,566,421 | A * | 9/1951 | Lapointe | 384/526 |
| 3,486,212 | A * | 12/1969 | Vannest | 29/898.067 |
| 5,033,878 | A * | 7/1991 | Tsuji et al. | 384/576 |
| 5,927,858 | A * | 7/1999 | Agari | 384/45 |
| 6,070,479 | A * | 6/2000 | Shirai | 384/51 |
| 6,116,783 | A * | 9/2000 | Shirai et al. | 384/43 |
| 6,247,846 | B1 * | 6/2001 | Shirai | 384/45 |
| 6,364,086 | B1 * | 4/2002 | Blaurock et al. | 193/35 MD |
| 6,575,630 | B2 * | 6/2003 | Blaurock et al. | 384/43 |
| 6,685,354 | B2 * | 2/2004 | Michioka et al. | 384/45 |
| 6,802,647 | B2 * | 10/2004 | Hausberger et al. | 384/45 |
| 6,821,604 | B2 * | 11/2004 | Kasuga et al. | 384/43 |
| 6,966,698 | B2 * | 11/2005 | Wu et al. | 384/49 |
| 7,044,642 | B2 * | 5/2006 | Liao et al. | 384/45 |
| 7,178,982 | B2 * | 2/2007 | Chin-Pei et al. | 384/51 |
| 7,320,547 | B2 * | 1/2008 | Kuo et al. | 384/45 |
| 7,736,060 | B2 * | 6/2010 | Matsumoto et al. | 384/45 |
| 2002/0090152 | A1 * | 7/2002 | Shirai et al. | 384/45 |
| 2006/0159373 | A1 * | 7/2006 | Matsumoto | 384/45 |
| 2007/0076989 | A1 * | 4/2007 | Matsumoto et al. | 384/45 |
| 2007/0147714 | A1 * | 6/2007 | Matsumoto et al. | 384/45 |
| 2007/0160313 | A1 * | 7/2007 | Kuo et al. | 384/51 |

FOREIGN PATENT DOCUMENTS

JP    5-52217 A    3/1993

(Continued)

OTHER PUBLICATIONS

Japanese Office Action issued Jun. 15, 2010, in counterpart Japanese Patent Application No. 2006-171278.

*Primary Examiner* — Marcus Charles
(74) *Attorney, Agent, or Firm* — Sughrue Mion, PLLC

(57) ABSTRACT

The metallic mold 90 includes a product configuration portion 93 formed between an upper mold 91 and a lower mold 92. This product configuration portion 93 is composed so that a rolling element accommodating belt 50 formed by this product configuration portion 93 can include spacer portions interposed between balls adjacent to each other in an infinite circulating passage and also include connecting arm portions for connecting the spacer portions to each other and so that the balls can be aligned in the alignment direction in the infinite circulating passage. The upper mold 91 has a splitting structure. In this splitting structure, a splitting position BL is set at a position passing through a position 91*t* for forming an end portion on the outer circumferential side in the inner and outer circumferential direction of the infinite circulating passage of the spacer portions 51.

6 Claims, 16 Drawing Sheets

FOREIGN PATENT DOCUMENTS

| | | |
|---|---|---|
| JP | 9-14264 A | 1/1997 |
| JP | 10-9264 A | 1/1998 |
| JP | 11-247856 A | 9/1999 |
| JP | 2001-105461 A | 4/2001 |
| JP | 2001-165169 A | 6/2001 |
| JP | 2002-130272 A | 5/2002 |
| JP | 2004-019723 A | 1/2004 |
| JP | 3105042 U | 10/2004 |
| JP | 2005-69444 A | 3/2005 |
| JP | 2006125582 A * | 5/2006 |
| JP | 2007092899 A * | 4/2007 |

* cited by examiner

ROLLING ELEMENT ACCOMMODATING BELT FOR LINEAR GUIDE APPARATUS, LINEAR GUIDE APPARATUS AND METALLIC MOLD FOR MANUFACTURING ROLLING ELEMENT ACCOMMODATING BELT

BACKGROUND OF THE INVENTION

1. Field of the Invention

The present invention relates to a rolling element accommodating belt, a linear guide apparatus and a metallic mold for manufacturing the rolling element accommodating belt.

2. Description of Related Art

In the linear guide apparatus, a slider is relatively moved with respect to a guide rail through a plurality of rolling elements which are rolling and circulating in an infinite circulating passage. However, in the linear guide apparatus, while the slider is relatively moving with respect to the guide rail, the rolling elements are rolling and moved in the same direction. Therefore, the rolling elements, which are adjacent to each other, are rubbed to each other. Accordingly, the rolling elements can not be smoothly rolled. Therefore, an intensity of noise is increased and abrasion of the rolling elements is facilitated. In order to solve the above problems by suppressing the generation of noise and making the linear guide apparatus operated smoothly, a rolling element accommodating belt is conventionally proposed in which the rolling elements are aligned in the alignment direction in the infinite circulating passage so as to smoothly operate the linear guide apparatus. Concerning this rolling element accommodating belt, for example, refer to Japanese Patent Unexamined Publications JP-A-05-52217, JP-A-2001-165169, JP-A-10-9264, JP-A-09-14264, JP-A-11-247856 and JP-A-2005-69444.

For example, according to the JP-A-05-52217, JP-A-2001-165169 and JP-A-10-9264, a rolling element accommodating belt is disclosed which includes spacer portions interposed between the rolling elements adjacent to each other and also includes connecting arm portions for connecting the spacer portions. According to the rolling element accommodating belt composed as described above, the rolling elements are aligned in a line in the alignment direction in the infinite circulating passage so as to suppress the generation of noise so that the rolling elements can be smoothly circulated in the infinite circulating passage. In this connection, according to the technique described in the JP-A-2001-165169, the rolling element accommodating belt is composed in such a manner that the rolling elements accommodated on the rolling element accommodating belt can be freely detached in a perpendicular direction to the front and the back surface of the rolling element accommodating belt.

This type rolling element accommodating belt is obtained when melted resin material is poured from a gate into a product configuration portion in a metallic mold. However, in the product configuration portion in the metallic mold, residual air and gas, which is generated from the melted resin material, exists. These gases tend to stay in a portion where a gas flowing passage comes to a dead end. Especially, these gases tend to stay in an end portion of the above spacer portion. Therefore, it is difficult for the melted resin to smoothly flow into this portion where the gases are staying. Accordingly, an underfill portion of resin (which is a portion where predetermined amount of resin is not filled) is generated on the rolling element accommodating belt formed in the mold. When the underfill portion of resin is generated in this way, there is a possibility that damage starts from this underfill portion of resin generated on the rolling element accommodating belt.

In this case, for example, according to the technique described in the JP-A-11-247856 or JP-A-2005-69444, a joint portion of the upper mold and the lower mold of the metallic mold can be made to function as a gas vent. However, at the end portion of the formed spacer portion, no means is provided for discharging gas. Therefore, gas tends to stay at the end portion of the formed spacer portion. Therefore, the spacer portion needs to be more investigated to discharge gas so that the generation of an under fill portion of resin can be prevented.

Further, concerning the method of manufacturing this type rolling element accommodating belt, for example, the JP-A-05-52217 discloses a technique in which the rolling elements are arranged in a metallic mold so that the rolling elements can be used as a core and then injection molding is conducted to manufacture the rolling element accommodating belt.

The JP-A-09-14264 discloses a technique in which injection molding is conducted while the rolling elements are being used as a core in the same manner as that described above. However, in order to solve a problem that a portion, in which the rolling elements are accommodated, and the rolling elements are tightly contacted with each other by the shrinkage caused at the time of forming, oil or water is absorbed after the completion of molding.

Another manufacturing method is disclosed in the JP-A-11-247856 as follows. For example, in the JP-A-11-247856, rolling element shaped-molds, the sizes of which are larger than the diameters of the rolling elements to be used, are arranged at predetermined intervals and injection molding is conducted to manufacture a rolling element accommodating belt.

The JP-A-2005-69444 discloses a technique in which a formed rolling element accommodating belt is detached from a metallic mold by obliquely moving the metallic mold used in the injection molding. In this case, in the examples disclosed in the JP-A-11-247856 and JP-A-2005-69444, a position of a dividing line of an upper mold and a lower mold is located at a peripheral portion of a spacer portion. Concerning this matter, refer to FIG. 2 of the JP-A-11-247856 and FIG. 9 of JP-A-2005-69444.

However, in the above method of manufacturing the rolling element accommodating belt, for example, in the technique described in the JP-A-05-52217 in which injection molding is conducted while the rolling elements are being used as a core, due to the shrinkage of material caused at the time of forming, sizes of portions, in which the rolling elements are accommodated, are reduced smaller than the predetermined sizes. Therefore, the rolling elements can not be smoothly rolled.

For example, in the technique described in the JP-A-09-14264, in order to avoid a case where the rolling elements can not be smoothly rolled because of the shrinkage caused at the time of forming, the processing of absorbing oil or the processing of absorbing water is conducted after the completion of forming. In this case, it is necessary to strictly control the conditions of processing of absorbing oil or absorbing water, which raises the manufacturing cost.

For example, in the technique described in the JP-A-11-247856, in the spacer portion which has been formed, a concave face corresponding to the circumferential face of the rolling element mold is formed as an under-cut portion. Therefore, when the rolling element belt is detached from the metallic mold, a strong force is given to the rolling element accommodating belt. Accordingly, there is a possibility that the rolling element accommodating belt is damaged or deformed.

Further, in the technique described in the JP-A-11-247856 and the JP-A-2005-69444, a position of the dividing line of the upper and the lower mold of the metallic mold is located in the peripheral portion of the spacer portion. Accordingly, burr is generated in the peripheral portion of the spacer portion. Due to the generation of burr, there is a possibility that the linear guide apparatus can not be smoothly operated. That is, at the time of forming, resin flows into a joint portion of the upper mold and the lower mold, which causes the generation of burr. In the case where this burr is generated in the peripheral portion of the spacer portion, when the rolling element accommodating belt circulates in the infinite circulating passage of the linear guide apparatus, the rolling element accommodating belt rubs an inner circumferential wall of the infinite circulating passage. Alternatively, the rolling element accommodating belt is hooked on the inner circumferential wall of the infinite circulating passage. Therefore, there is a possibility that a smooth operation of the linear guide apparatus is obstructed.

In the case of the rolling element accommodating belt disclosed in JP-A-2001-165169, the rolling elements accommodated there can be freely detached in a direction perpendicular to the surface side and the back side of the rolling element accommodating belt. For example, as exemplarily shown in FIG. 17, a position of the dividing line of the metallic mold of the spacer portion is formed while crossing a face including a portion coming into contact with the rolling elements. When the dividing line of the metallic mold is set at this position, burr is not generated in the periphery of the spacer portion, however, burr is generated in a portion coming into contact with the rolling elements. Therefore, by the burr protruding onto the rolling element side, the face, which is to be contacted with the rolling elements, and the rolling elements can not be stably contacted with each other. Accordingly, smooth operation of the linear guide apparatus is obstructed. In order to prevent the above generation of burr, it is necessary to enhance the accuracy of the joint face of the metallic mold. Alternatively, it is necessary to severely control the forming condition. However, when the above countermeasures are taken, the manufacturing cost is raised.

SUMMARY OF THE INVENTION

In view of the above, one object of the present invention is to provide a metallic mold for manufacturing a rolling element accommodating belt in which the forming of the underfill portion is prevented or refrained, a rolling element accommodating belt for a linear guide apparatus manufactured by the metallic mold, and a linear guide apparatus provided with thus obtained rolling element accommodating belt.

Further, another object of the invention is to provide a rolling element accommodating belt for a linear guide apparatus, the linear guide apparatus and a metallic mold for manufacturing the rolling element accommodating belt capable of smoothly circulating the rolling element accommodating belt even when the burr is generated.

According to a first aspect of the invention, there is provided a metallic mold for injection molding a rolling element accommodating belt for a linear guide apparatus, which has an infinite circulating passage in which a plurality of rolling elements are rolling and circulating, the rolling element accommodating belt including:

a spacer portion interposed between the rolling elements adjacent to each other; and a connecting arm portion for connecting the spacer portions to each other, wherein the rolling elements are aligned in the infinite circulating passage in an alignment direction, the metallic mold including:

an upper mold;

a lower mold; and a product configuration portion provided between the upper mold and the lower mold, wherein the rolling element accommodation belt is molded within the product configuration portion, and at least one of the upper and the lower mold has a splitting structure in which a splitting position is located at a position where an end portion of at least one side of inner and outer circumferential direction of the infinite circulating passage of the spacer portion is formed.

According to the first aspect of the invention, a splitting position of a metallic mold is set at a position passing through a position for forming an end portion on at least one side in the inner and outer circumferential direction of the infinite circulating passage of the spacer portion. Therefore, a joint portion of the splitting position of the metallic mold can be made to function as a gas vent at the end portion of the spacer portion. Therefore, it is possible to prevent or suppress gas from staying in the end portion of the spacer portion in which gas tends to stay. Accordingly, it becomes possible for the resin to flow to the end portion of the spacer portion. Consequently, the underfill of resin caused at the time of forming can be prevented or suppressed.

According to a second aspect of the invention, there is provided a rolling element accommodating belt manufactured by the metallic mold as set forth in the first aspect of the invention.

According to the second invention, the rolling element accommodating belt is manufactured by the metallic mold for manufacturing the rolling element accommodating belt of the first invention. Therefore, it is possible to provide a rolling element accommodating belt on which the generation of an underfill portion of resin, which is caused in the end portion of the spacer portion at the time of forming, can be suitably prevented.

According to a third aspect of the invention, there is provided a rolling element accommodating belt for a linear guide apparatus, which has an infinite circulating passage in which a plurality of rolling elements are rolling and circulating, the rolling element accommodating belt including:

a spacer portion interposed between the rolling elements adjacent to each other; and a connecting arm portion for connecting the spacer portions to each other, wherein the rolling elements are aligned in the infinite circulating passage in an alignment direction, the rolling element accommodation belt is formed by injection molding by using a metallic mold having splitting structure, and a parting line of the metallic mold is transferred to an end portion on at least one side of inner and outer circumferential direction of the infinite circulating passage in the spacer portion.

According to the third aspect of the invention, the rolling element accommodating belt for a linear guide apparatus of the present invention is provided. Therefore, it is possible to provide a linear guide apparatus provided with a rolling element accommodating belt, the quality of which is stabilized, having no underfill portion of resin in the spacer portion.

According to a sixth aspect of the invention, there is provided a rolling element accommodating belt for a linear guide apparatus, which has an infinite circulating passage in which a plurality of rolling elements are rolling and circulating, the rolling element accommodating belt including:

a spacer portion interposed between the rolling elements adjacent to each other; and a connecting arm portion for connecting the spacer portions to each other, wherein the rolling elements are aligned in the infinite circulating passage in an alignment direction, and a face of each spacer portion directed to the rolling element includes:

a non-contact face which does not contact with the rolling element; and a contact face which is hollow with respect to the non-contact face and contacts with the rolling element.

According to the sixth aspect of the invention, the spacer portion includes: a non-contact face on which a face of the spacer portion directed to the adjacent rolling element side is not contacted with the adjacent rolling element; and a contact face on which a face of the spacer portion directed to the adjacent rolling element side is contacted with the adjacent rolling element. Therefore, for example, a dividing line of the metallic mold can be set on the non-contact face. Due to the foregoing, with respect to the circumferential edge portion of the spacer portion and with respect to the contact face having a portion coming into contact with the rolling element, while the dividing line of the metallic mold is not being provided, the rolling element accommodating belt can be composed. Therefore, even in the case where burr is generated at a position of the joint portion of the metallic mold, it is possible to prevent the burr from rubbing an inner circumferential wall of the infinite circulating passage. Further, it is possible to prevent the burr from being hooked on the inner circumferential wall of the infinite circulating passage. Furthermore, there is no possibility that a stable contacting state of the contact face with the rolling elements is deteriorated. Accordingly, even when burr is generated, the rolling element accommodating belt can be smoothly circulated. When countermeasures are taken in order to prevent the generation of burr, it is possible to mitigate the degree of enhancing the accuracy of the joint portion of the metallic mold. It is also possible to mitigate the degree of controlling the forming condition. Therefore, the manufacturing cost can be reduced.

In the case of the rolling element accommodating belt related to the sixth aspect of the invention, it is preferable that the non-contact face is formed into a plane perpendicular to the alignment direction in the infinite circulating passage. Due to the above structure, when a releasing direction of the upper and the lower mold is set in the direction in which the non-contact face is formed, releasing can be easily executed.

In the case of the rolling element accommodating belt related to the sixth aspect of the invention, the rolling element accommodating portions for individually accommodating the rolling elements are defined by the spacer portions and the connecting arm portions. It is preferable that the rolling element accommodating portions are formed so that the rolling elements accommodated there can be allowed to move at least to one side in the inner and the outer circumferential direction of the infinite circulating passage. Due to the above structure, when the rolling element accommodating belt is pushed with pushing pins from a side on which the rolling elements are allowed to move after the rolling element accommodating belt has been formed in the metallic mold, it is possible to release the rolling element accommodating belt from a side on which no undercut is formed. Therefore, releasing can be conducted without giving an extremely strong force to the rolling element accommodating belt.

In the case of the rolling element accommodating belt related to the sixth aspect of the invention, the rolling element accommodating belt is formed of synthetic resin by injection molding with the metallic mold, between the upper mold and the lower mold of which the product configuration portion for forming the rolling element accommodating belt concerned is provided. It is preferable that the dividing line of the upper mold and the lower mold is formed on the non-contact face of the spacer portion or on the boundary between the non-contact face and the contact face. Due to the above structure, the rolling element accommodating belt can be composed without providing a dividing line of the metallic mold with respect to the peripheral portion of the spacer portion and with respect to the contact face having a portion coming into contact with the rolling element. Accordingly, even when burr is generated, the rolling element accommodating belt can be smoothly circulated. When the dividing line of the upper mold and the lower mold is provided on the boundary between the non-contact face and the contact face, the structure of the upper and the lower mold can be more simplified.

According to a seventh aspect of the invention, there is provided a linear guide apparatus including a rolling element accommodating belt as set forth in the sixth aspect of the invention.

According to the seventh aspect of the invention, it is possible to provide a linear guide apparatus by which an action and advantage provided by the rolling element accommodating belt for a linear guide apparatus of the sixth aspect of the invention can be provided.

According to an eleventh aspect of the invention, there is provided a metallic mold for manufacturing the rolling element accommodating belt according to claim 6 by injection molding, the metallic mold including:

an upper mold; and a lower mold, wherein a product configuration portion for forming the rolling element accommodating belt is formed between the upper mold and the lower mold, and the upper mold and the lower mold are divided on a position where the non-contact face of the spacer portion or on a boundary between the non-contact face and the contact face is formed.

According to the eleventh aspect of the invention, it is possible to provide a metallic mold for manufacturing a rolling element accommodating belt preferably used for manufacturing the rolling element accommodating belt for a linear guide apparatus of the first invention.

As described above, according to the present invention, it is possible to provide a metallic mold for manufacturing a rolling element accommodating belt capable of preventing or suppressing an underfill portion of resin generated at the time of forming. It is also possible to provide a rolling element accommodating belt for a linear guide apparatus manufactured by the metallic mold. It is also possible to provide a linear guide apparatus provided with the rolling element accommodating belt.

Further, according to the present invention, it is possible to provide a rolling element accommodating belt for a linear guide apparatus capable of smoothly circulating the rolling element accommodating belt even when burr is generated. It is also possible to provide the linear guide apparatus and a metallic mold for manufacturing the rolling element accommodating belt.

BRIEF DESCRIPTION OF THE DRAWINGS

FIG. 3 is a sectional view taken on line III-III of the linear guide shown in FIG. 2;

DETAILED DESCRIPTION OF EXEMPLARY EMBODIMENTS OF THE INVENTION EMBODIMENTS

Figure 1:
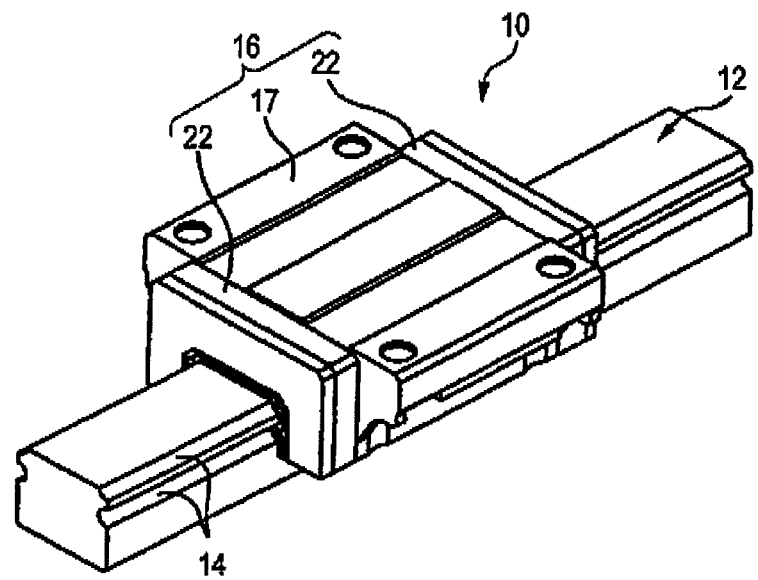
FIG. 1 is a perspective view showing a linear guide of the first embodiment of the present invention.

Appropriately referring to the drawings, embodiments of the rolling element accommodating belt for a linear guide apparatus of the present invention, the linear guide apparatus provided with the rolling element accommodating belt and the metallic mold for manufacturing the rolling element accommodating belt will be explained below.

First Embodiment

At first, the first embodiment of the present invention according to the first to fifth aspects of the invention will be explained.

Figure 2:
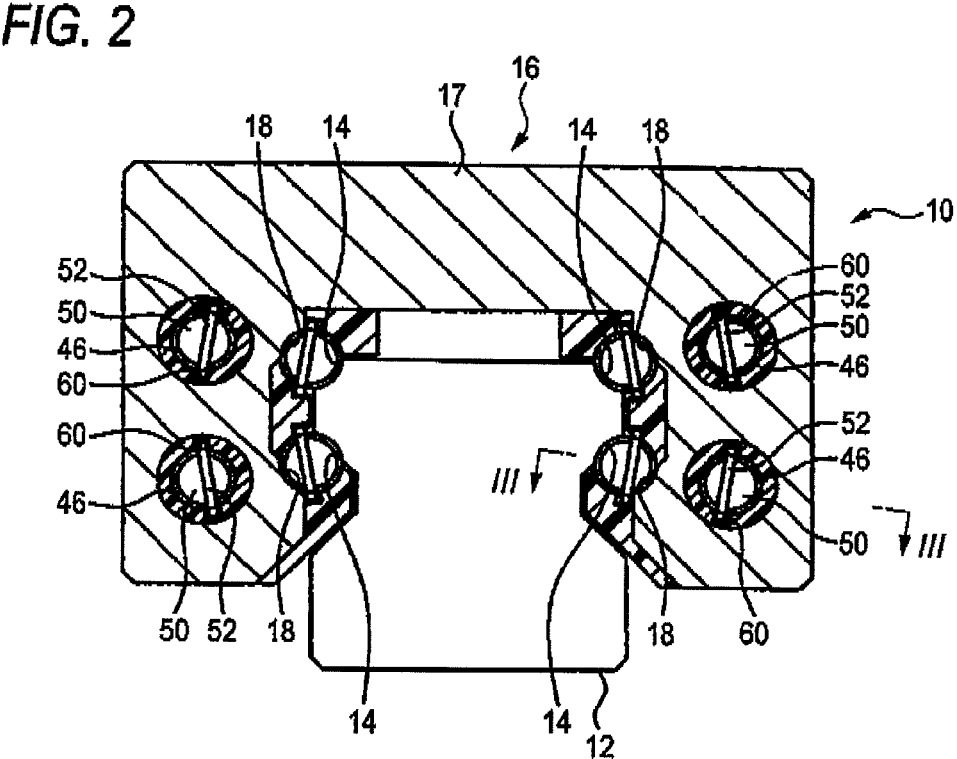
FIG. 2 is a front view showing the linear guide of FIG. 1 from which an end cap has been removed.
Figure 3:
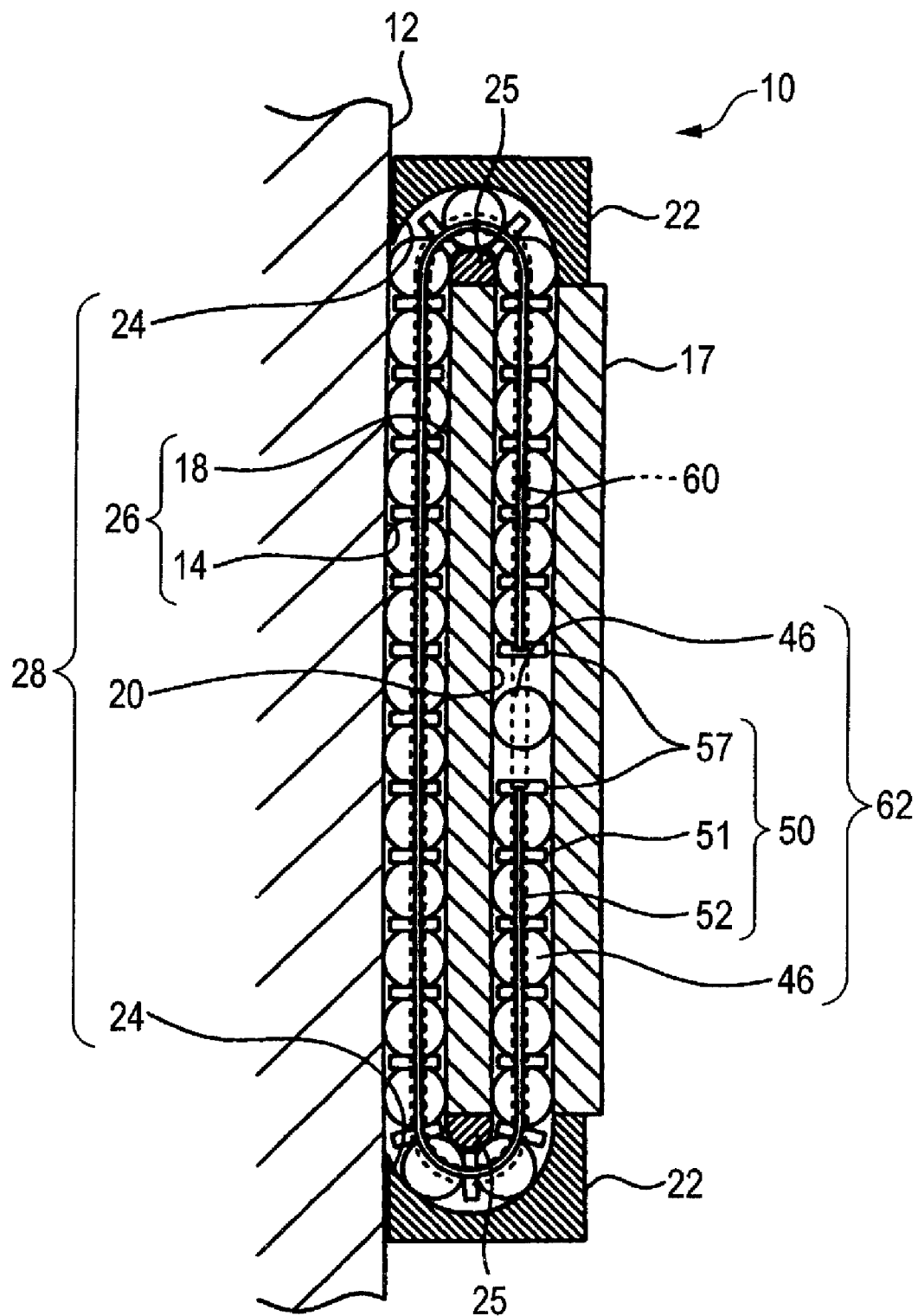
FIG. 3 is a view for explaining the linear guide of the present invention.

FIG. 1 is a perspective view showing a linear guide of the first embodiment of a linear guide apparatus having a rolling element accommodating belt of the present invention. FIG. 2 is a front view showing the linear guide of FIG. 1 from which an end cap has been removed. FIG. 3 is a sectional view taken on line X-X of the linear guide shown in FIG. 2.

As shown in FIGS. 1 and 2, this linear guide 10 includes: a guide rail 12 having a rolling element guide face 14; and a slider 16 mounted on the guide rail 12 so that the slider 16 can be relatively moved with respect to the guide rail 12.

The guide rail 12 has a substantially square cross section. On both sides of the guide rail 12, four rolling element guide faces 14 are provided, that is, two rolling element guide faces 14 are provided on one side of the guide rail 12 and two rolling element guide faces 14 are provided on the other side. These rolling element guide faces 14 are linearly formed in the longitudinal direction of the guide rail 12.

As shown in FIG. 1, the slider 16 includes: a slider body 17; and end caps 22 respectively attached to both end portions in the axial direction of the slider body 17. Cross sections of both the slider body 17 and end caps 22 in the axial direction are C-shapes.

As shown in FIG. 2, in the slider body 17, four loaded rolling element guide faces 18, the cross sections of which are substantially semicircular, are formed on the inside of both sleeve portions, the shapes of which are formed into C-shape, wherein the four loaded rolling element guide faces 18 are respectively opposed to the rolling element guide faces 14 of the guide rail 12. As shown in FIG. 3, a pair of direction changing passages 24, which are respectively connected to both end portions of the loaded rolling element guide face 18, are formed in the end cap 22. As shown in FIGS. 2 and 3, inside the sleeve portion of the slider body 17, a rolling element return passage 20, is formed, which is communicated with the pair of direction changing passages 24 and formed out of a circular through-hole parallel with the loaded rolling element guide face 18. A space interposed between the rolling element guide face 14 of the guide rail 12 and the loaded rolling element guide face 18 of the slider body 17, which is opposed to the rolling element guide face 14, is a rolling element passage 26. Four annular continuous infinite circulating passages 28 are formed out of a pair of direction changing passages 24, the rolling element return passage 20 and the rolling element passage 26. Further, into the infinite circulating passages 28, a plurality of balls 46, which are rolling elements, are charged. The plurality of balls 46 charged into each infinite circulating passages 28 compose a row 62 of rolling elements by the rolling element accommodating belt 50 together with the rolling element accommodating belt 50.

Figure 4A:
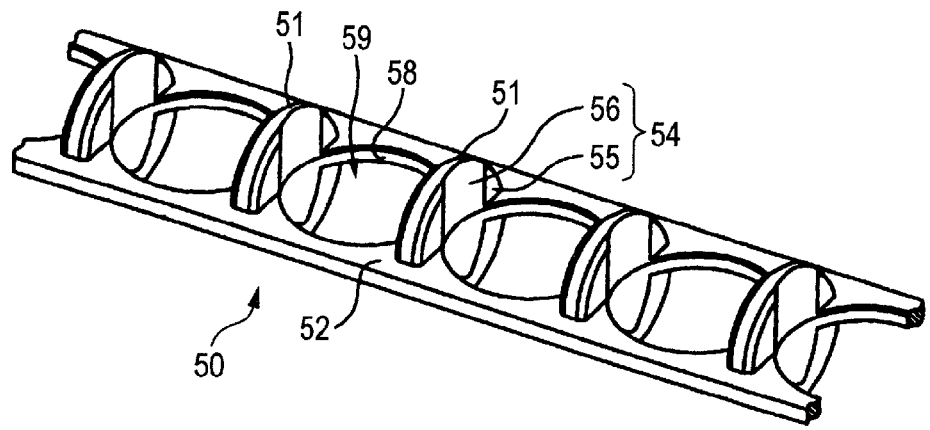
FIG. 4A is a view for explaining a rolling element accommodating belt of the present invention.
Figure 4B:
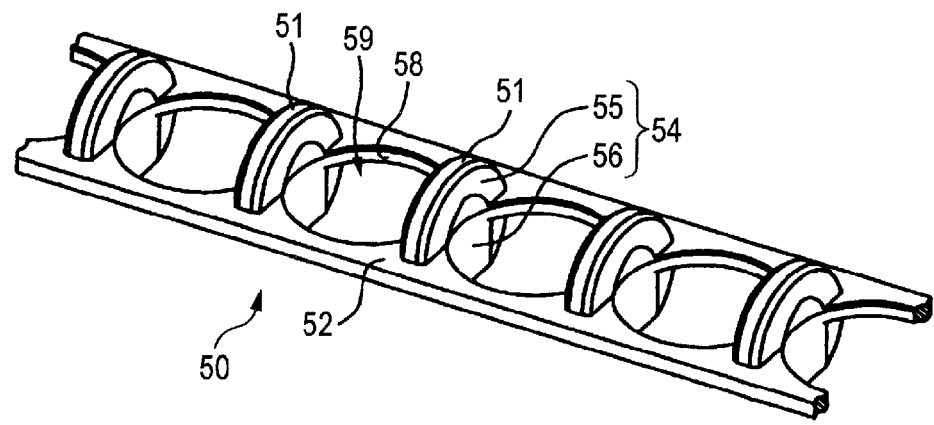
FIG. 4B is a view for explaining a rolling element accommodating belt of the present invention.
Figure 4C:
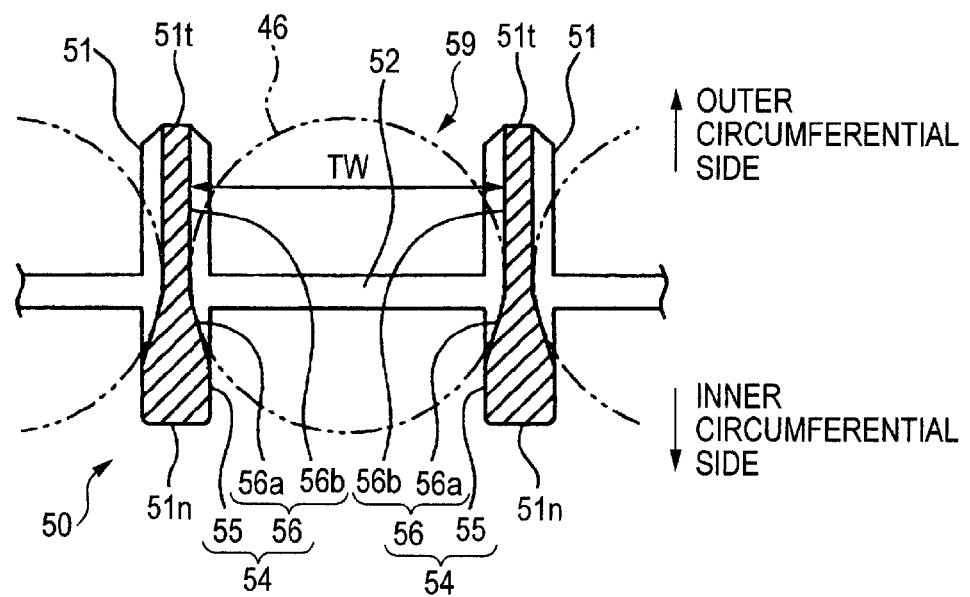
FIG. 4C is a view for explaining a rolling element accommodating belt of the present invention.

Appropriately referring to FIGS. 3 and 4, this rolling element accommodating belt 50 will be explained below in more detail. FIG. 4 is a schematic illustration for explaining the rolling element accommodating belt. FIG. 4A is a perspective view of the rolling element accommodating belt, wherein the view is taken from the outer circumference side of the infinite circulating passage. FIG. 4B is a perspective view of the rolling element accommodating belt, wherein the view is taken from the inner circumference side of the infinite circulating passage. FIG. 4C is a sectional view of the rolling element accommodating belt, wherein the view is taken in the alignment direction of the balls.

As shown in FIG. 3, this rolling element accommodating belt 50 is formed being provided with end portions. This rolling element accommodating belt 50 includes: spacer portions 51 interposed between the balls 46 which are adjacent to each other in the infinite circulating passage 28; and connecting arm portions 52 for connecting the spacer portions 51 with each other. These spacer portions 51 and the connecting arm portions 52 are integrally formed out of synthetic resin, which is a flexible, extensible, elastic material, by means of injection molding. An example of this synthetic resin material is a flexible thermoplastic material such as polyester elastomer and polyurethane.

As shown in FIG. 3, the connecting arm portions 52 are thin, long and belt-shaped members. As shown in FIG. 4, the ball accommodating holes 58, which are circular through-holes for accommodating the balls 46, are formed being arranged in the longitudinal direction. Inner diameters of these ball accommodating holes 58 are formed so that the balls 46 can be freely engaged in and disengaged from the ball accommodating holes 58 in the direction of the surface side and the back side of the connecting arm portions 52.

As shown in FIG. 4, the spacer portions 51 are arranged on both sides of the ball accommodating holes 58 in the alignment direction of the balls 46 with respect to the connecting arm portions 52. These spacer portion 51 are short columnar members, the outer diameters of which are a little smaller than the outer diameters of the balls 46. The axis of the short columnar shape agrees with the longitudinal direction of the rolling element accommodating belt 50. The spacer portions 51 are arranged on both sides of the ball accommodating holes 58 at predetermined intervals and connected to each other by the connecting arm portion 52 at both sides in the width direction of the infinite circulating passage 28. Both end portions of the short columnar shapes are formed to be faces 54 directed to the adjacent balls 46 in the infinite circulating passage 28.

On this rolling element accommodating belt 50, a space defined by each spacer portion 51 and the ball accommodating hole 58 of the connecting arm portion 52 is formed into the rolling element accommodating portion 59. When the balls 46 are individually accommodated in these rolling element accommodating portions 59 and aligned in the alignment direction in the infinite circulating passage 28, a row of rolling elements 62 can be composed. As shown in FIG. 2, on this rolling element accommodating belt 50, the connecting arm portions 52 are respectively protruded on both sides in the width direction in the infinite circulating passage 28. The thickness of the connecting arm portions 52 is a little smaller than the groove width of the guide groove 60, that is, the thickness of the connecting arm portions 52 is determined to be thin as long as the sufficiently and necessarily high mechanical strength can be maintained. These connecting arm portions 52 are slidably engaged in the guide groove 60 so that the connecting arm portions 52 can be guided on both sides in the width direction of the infinite circulating passage 28. In this connection, as shown in FIG. 3, on this rolling element accommodating belt 50, two end portions 57 respectively located at both ends the rolling element accommodating belt 50 are opposed to each other in the infinite circulating passage 28 being not contacted with each other. Between the end portions 57 opposed to each other, one ball 46 is charged.

As shown in FIG. 4, on this rolling element accommodating belt 50, the face 54 of the spacer portion 51 directed to the adjacent ball 46 side includes: a no-contact face 55 which is not contacted with the adjacent ball 46; and a contact face 56 which is formed becoming hollow with respect to the no-contact face 55.

To be in detail, the no-contact face 55 is formed into a plane which is arranged in a direction perpendicular to the alignment direction of the balls in the infinite circulating passage 28. On the other hand, the contact face 56 is formed into a face having a portion coming into contact with the spherical face of the ball 46 which is a rolling face. In the example of the present embodiment, each contact face 56 includes: a side portion 56b formed out of a recessed cylindrical face extending to the outer circumferential side by the same width; and an inclined face portion 56a which is a recessed conical face, the width of which is increased toward the end portion on the inner circumferential side.

The contact faces 56 of the spacer portions 51, which are opposed to each other in the alignment direction, are formed into a pair. Therefore, the spacer portions 51 can hold the balls 46 so that the balls 46 can be freely rolled while the balls 46 in the rolling element accommodating portions 59 can be moved onto the outer circumferential side of the infinite circulating passage 28 and restricted toward the inner circumferential side.

That is, as shown in FIG. 4C, the contact faces 56 of the spacer portions 51, which are adjacent to each other, are formed into a pair. A distance TW between the side portions 56b opposed to each other of the pair of contact faces 56 is the same as the inner diameter of the ball accommodating hole 58. Therefore, the ball 46 accommodated in each ball accommodating hole 58 can be allowed to move toward the outer circumferential side of the infinite circulating passage 28. On the other hand, the inclined face portions 56a of the pair of contact faces 56 are formed into recessed conical faces coming into contact with the ball by a predetermined inclined angle with respect to the alignment direction. Therefore, the ball 46 accommodated in each ball accommodating hole 58 is restricted from moving toward the inner circumferential side of the infinite circulating passage 28.

In the thus composed linear guide 10, when the slider 16 is relatively moved in the axial direction of the guide rail 12 while the balls 46 are rolling in the infinite circulating passage 28, the rolling element accommodating belt 50 is also moved in the infinite circulating passage 28 together with the balls 46. At this time, in the infinite circulating passage 28, the spacer portion 51 of the rolling element accommodating belt 50 pushes the ball 46 located in the front in the moving direction. Further, the ball 46 pushes the spacer portion 51 located in the front in the moving direction. Due to the foregoing, the entire rolling element row 62 circulates in the infinite circulating passage 28. The rolling element row 62 is moved in the opposite direction to the slider 16 in the rolling element passage 26. The rolling element row 62 enters from one end portion of the rolling element passage 26 into one direction changing passage 24 so that the moving direction of the rolling element row 62 can be changed. The rolling element row 62 enters from the direction changing passage 24 into the rolling element return passage 20 and moves in the same direction as that of the slider 16. The rolling element row 62 enters into the other direction changing passage 24 so that the moving direction can be changed again. Then, the rolling element row 62 returns to the rolling element passage 26. The above circulation of the rolling element row 62 can be repeated. The connecting arm portion 52 of each rolling element accommodating belt 50 is engaged with the guide groove 60. Therefore, it is possible to prevent each spacer portion 51 from falling down in the rolling element passage 26. Further, it is possible to prevent an arrangement of the rolling element row 62 from being disturbed, that is, it is possible to prevent a smooth movement of the rolling element row 62 from being obstructed. Since the connecting arm portion 52 of the rolling element accommodating belt 50 is guided by the infinite circulating passage 28 along the guide groove 60, deviation of the rolling element accommodating belt 50 is restricted while it is moving. Further, deviation of the ball 46 held between the connecting arm portions 52 of the rolling element accommodating belt 50 is also restricted. Therefore, the entire rolling element row 62 can be accurately, smoothly moved in the infinite circulating passage 28.

Figure 5A:
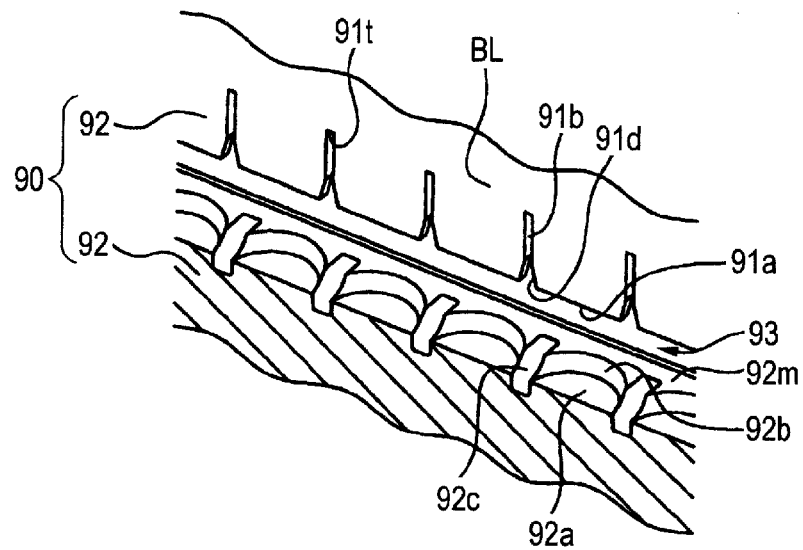
FIG. 5A is a perspective view showing only the inner side of a split upper mold of the metallic mold of the invention and also showing a split lower mold which is cut in the longitudinal direction of a rolling element accommodating belt to be formed.

In this case, the above rolling element accommodating belt 50 is manufactured by means of injection molding with the metallic mold shown in FIG. 5.

Figure 5B:
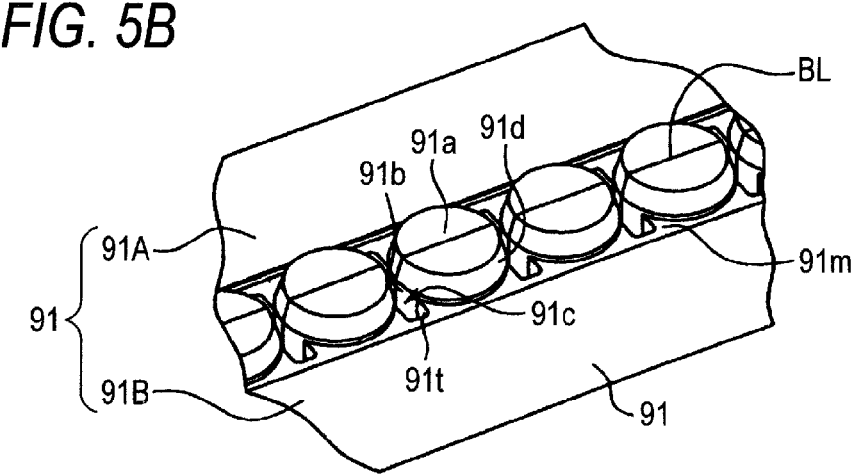
FIG. 5B is a perspective view of a product configuration portion of the upper mold of the metallic mold.
Figure 5C:
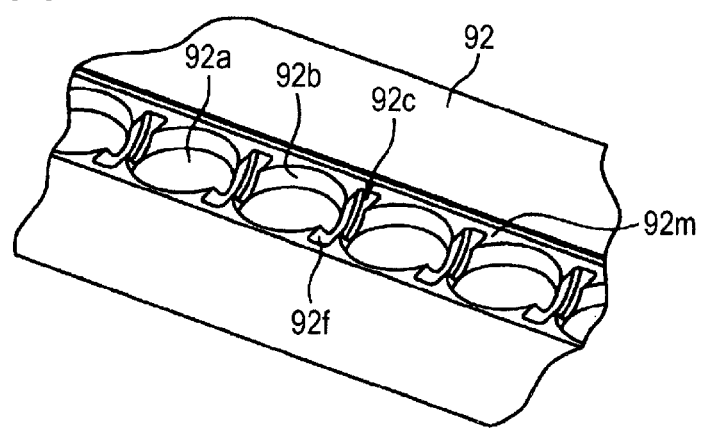
FIG. 5C is a perspective view showing a product configuration portion of the lower mold of the invention.
Figure 6A:
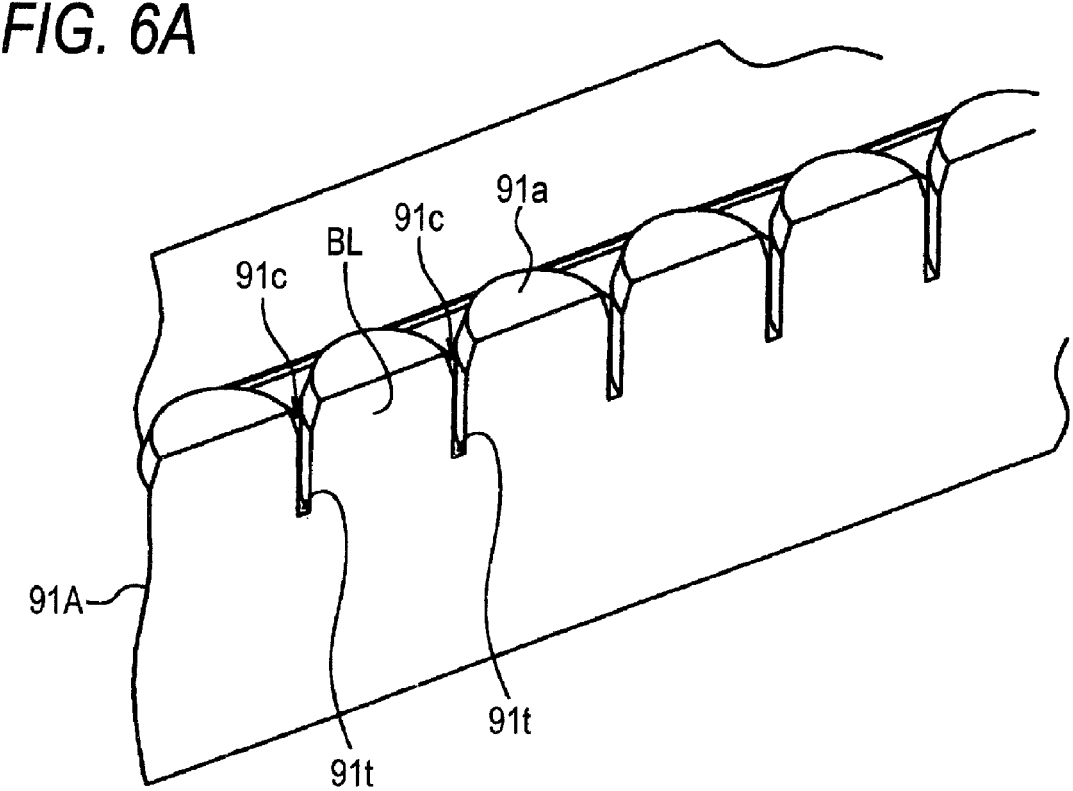
FIG. 6A is a perspective view showing a split inner side of the metallic mold of the invention.
Figure 6B:
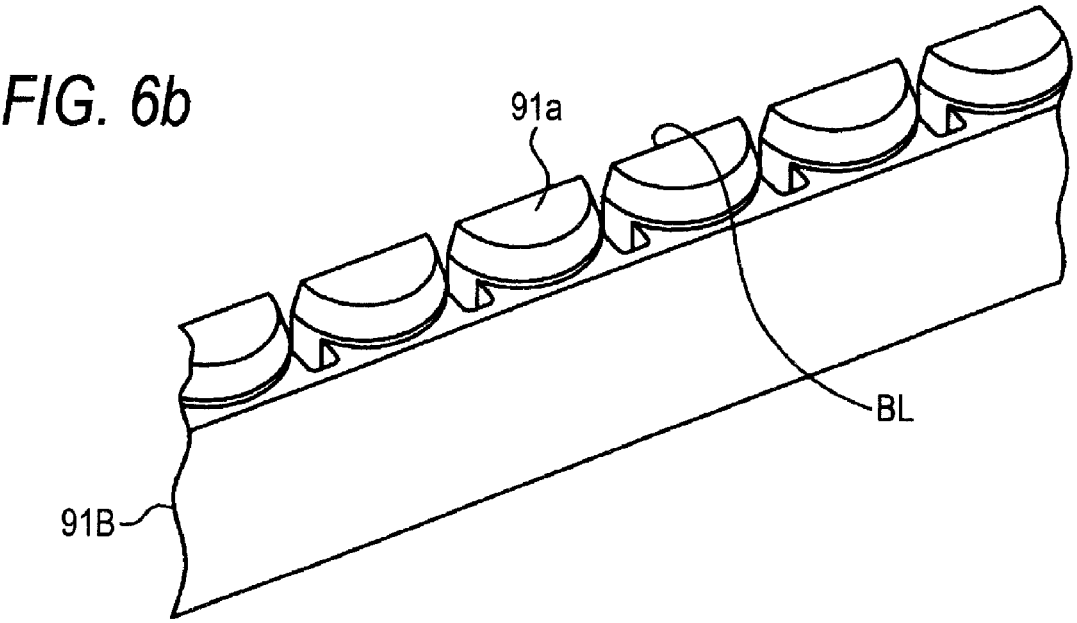
FIG. 6B is a perspective view showing a split viewer's side of the metallic mold of the invention.

Referring to FIGS. 5 to 7, explanations will be made into the metallic mold, which is used for manufacturing the rolling element accommodating belt 50, and the manufacturing step of injection molding in which this metallic mold is used. In this connection, injection molding is conducted according to a conventional method. Therefore, only an outline of injection molding will be described here.

Steel products are used for the metallic mold which is a form for forming this rolling element accommodating belt 50. As shown in FIG. 5, this metallic mold 90 includes: an upper mold 91 which is a movable side metallic mold; and a lower mold 92 which is a stationary side metallic mold. The upper mold 91 and the lower mold 92 are arranged being opposed to each other as shown in FIG. 6A. As shown in FIG. 7, a gap portion defined between the upper mold 91 and the lower mold 92 is a product configuration portion (cavity) 93.

A configuration of the product configuration portion 93 formed between the upper mold 91 and the lower mold 92 is formed when a configuration of the rolling element accommodating belt 50, which is a product, is inverted so that a relation between male and female can be inverted. Further, a size of the product configuration portion 93 is decided when consideration is given to a deformation generated in the step of injection molding.

That is, as shown in FIG. 5, the configuration of this metallic mold 90 is formed when the configuration of the rolling element accommodating portion 59 is inverted so that the relation between male and female can be inverted. In the upper mold 91, a plurality of protruded truncated cone portions 91a are formed in the longitudinal direction in the upper mold 91. On the other hand, in the lower mold 92, a plurality of recessed truncated cone portions 92a are formed which are arranged being opposed to the protruded truncated cone portions 91a of the upper mold 91 and agree with the protruded truncated cone portions 91a so that the recessed truncated cone portions 92a can be engaged with the protruded truncated cone portions 91a.

In the upper mold 91, in the periphery on the base end side of the protruded truncated cone portions 91a, a plane portion 91m for forming the connecting arm portion 52 is formed. In the lower mold 92, in the periphery on the side on which the recessed truncated cone portion 92a is open, a plane portion 92m is formed which forms the connecting arm portion 52 together with the plane portion 91m. Further, in the longitudinal direction of the metallic mold 90, in the upper mold 91, recess portions 91c for forming the spacer portions 51 are formed on both sides of the protruded truncated cone portion 91a. On the other hand, in the lower mold 92, recess portions 92c for forming the spacer portions 51 are formed on both sides of the recessed truncated cone portions 92a. Configurations of these portions are formed into configurations obtained when configurations of the spacer portions 51 are inverted.

The contact face 56 of the spacer portion 51 is formed by the inclined portion 91d of the protruded truncated cone portion 91a of the upper mold 91 and by the protruded cylindrical portion 91b formed in the recessed portion 91c for forming the spacer portion 51. The no-contact face 55 of the spacer portion 51 is formed by the plane portion 91f which is formed in the recessed portion 91c of the upper mold 91 and directed in the longitudinal direction and by the plane portion 92f which is formed in the recessed portion 92c of the lower mold 91 and directed in the longitudinal direction. In this connection, directions of the plane portions 91f and 92f are set so that no-contact face 55 of the formed rolling element accommodating belt 50 can be a plane formed in a direction perpendicular to the alignment direction of the infinite circulating passage 28. Further, releasing directions of the upper mold 91 and the lower mold 92 are set in a direction in which no-contact face 55 is formed. A splitting position between the upper mold 91 and the lower mold 92 is located close to the lower mold 92. The end portion 51n on the inner circumferential side of the spacer portion 51 is located in the neighborhood of the lower mold 92.

In this case, as shown in FIGS. 5B and 6, this upper mold 91 has a splitting structure in which the upper mold 91 is split in the longitudinal direction. That is, in the upper mold 91, a splitting position BL is set in the longitudinal direction at the center in the width direction. The upper mold 91 is split at the splitting position BL into two pieces of one side and the other side with respect to the width direction, that is, the upper mold 91 is split into two upper molds 91A and 91B. The splitting position BL of the upper mold 91 is set at a position passing through a forming position 91t, which will be referred to as an end portion forming position hereinafter, for forming the end portion 51t (shown in FIG. 4C) on the outer circumferential side in the inner and outer circumferential direction of the infinite circulating passage 28 in the spacer portion 51.

As shown in FIG. 7, in this metallic mold 90, gates 94 for pouring melted synthetic resin into the product configuration portions 93 are provided in the lower mold 92. A necessary number of gates 94 are provided at positions corresponding to the end portion on the inner circumferential side of the spacer portion 51 to be formed. In the example shown in the drawing, the gates are provided every two spacer portions 51 apart. On the upper mold 91 side, a plurality of pushing pins 95 are provided. These pushing pins 95 are arranged being opposed to wide portions of the connecting arm portions 52 connecting the space portions 51, that is, these pushing pins 95 are arranged being opposed to peripheries of portions connecting the spacer portions 51 with the connecting arm portions 52. In this connection, the pushing pins 95 are arranged on a side having the product configuration portion 93 on the side on which the balls 46 are allowed to move in the upper mold 91 and the lower mold 92.

Figure 7B:
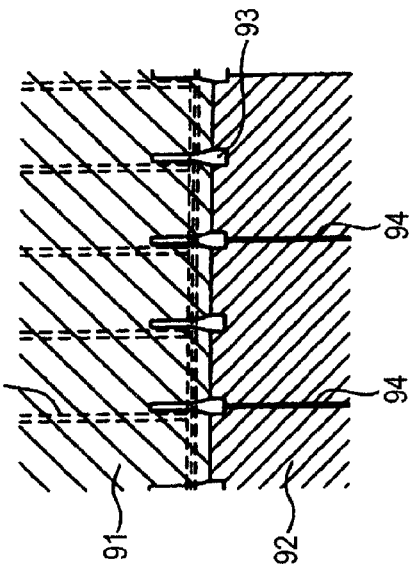
FIGS. 7A to 7D are schematic illustrations for explaining a forming step in which a rolling element accommodating belt is formed by a metallic mold for manufacturing a rolling element accommodating belt of the present invention.
Figure 7D:
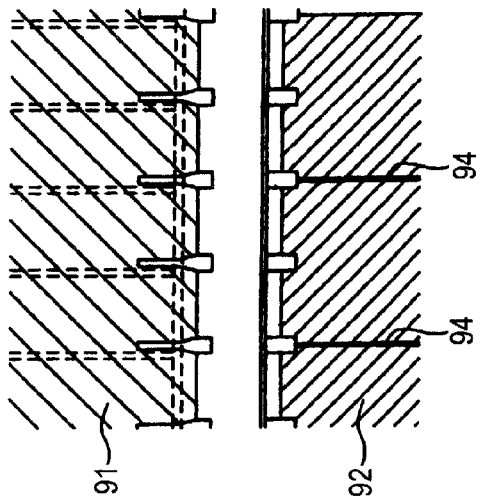
Figure 7A:
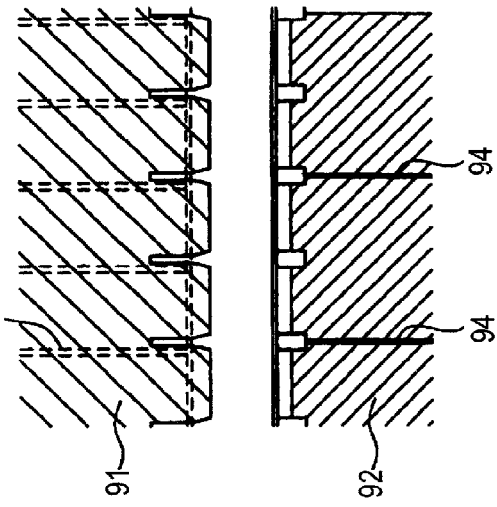
Figure 7C:
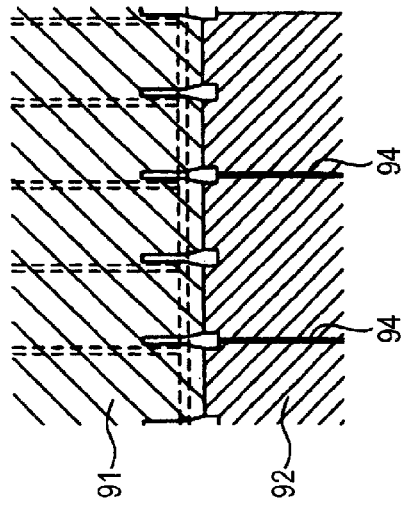

The manufacturing step is conducted by the above metallic mold 90 as follows. First, the two split upper molds 91A and 91B are combined with each other into the upper mold 91. Then, as shown in FIG. 7A, the upper mold 91 and the lower mold 92 are respectively arranged at predetermined positions being opposed to each other. Next, as shown in FIG. 7B, the upper mold 91 is moved downward so as to make the upper mold 91 and the lower mold 92 tightly come close to each other at a predetermined opposing position. Next, as shown in FIG. 7C, melted synthetic resin is injected from the gates 94, which are arranged in the lower mold 92, into the product configuration portions 93. Next, after the injected synthetic resin has been solidified, as shown in FIG. 7(d), the upper mold 91 is moved upward so as to open the mold in the vertical direction. Then, by the pushing pins 95 arranged on the upper mold 91 side, the thus formed rolling element accommodating belt 50 is pushed out and picked up. In this way, the rolling element accommodating belt 50 described above can be manufactured. Therefore, in the end portion 51t of the spacer portion 51 on the rolling element accommodating belt 50, a trace of the parting line of the metallic mold 90 is formed.

Next, actions and advantages of the above metallic mold 90, the rolling element accommodating belt 50 manufactured by this metallic mold 90 and the linear guide 10 having this rolling element accommodating belt 50 will be explained below.

According to the above metallic mold 90, the splitting position BL of the metallic mold is set at a position passing through the end portion forming position 91t of the upper mold 91. Therefore, a joint portion of this splitting position BL can be made to function as a gas vent.

Figure 8A:
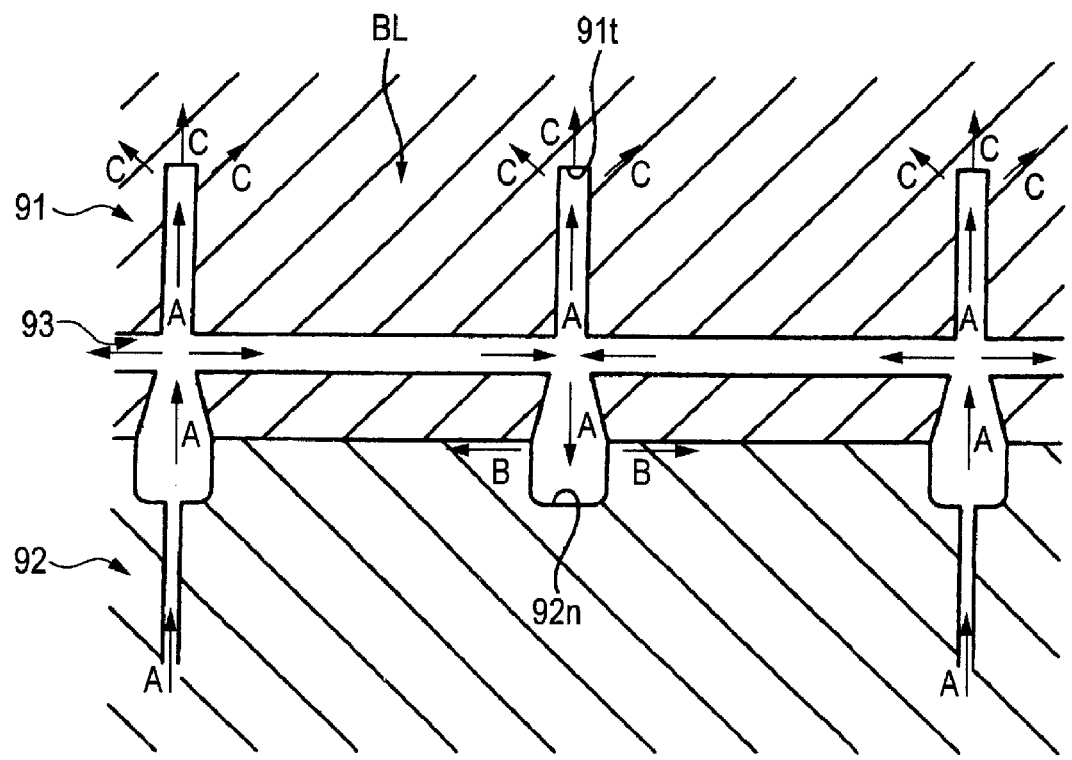
FIG. 8A is an enlarged view showing a primary portion of FIG. 7C and also showing a model of a flow of resin in the case of pouring the resin into a product configuration portion of a metallic mold.
Figure 8B:
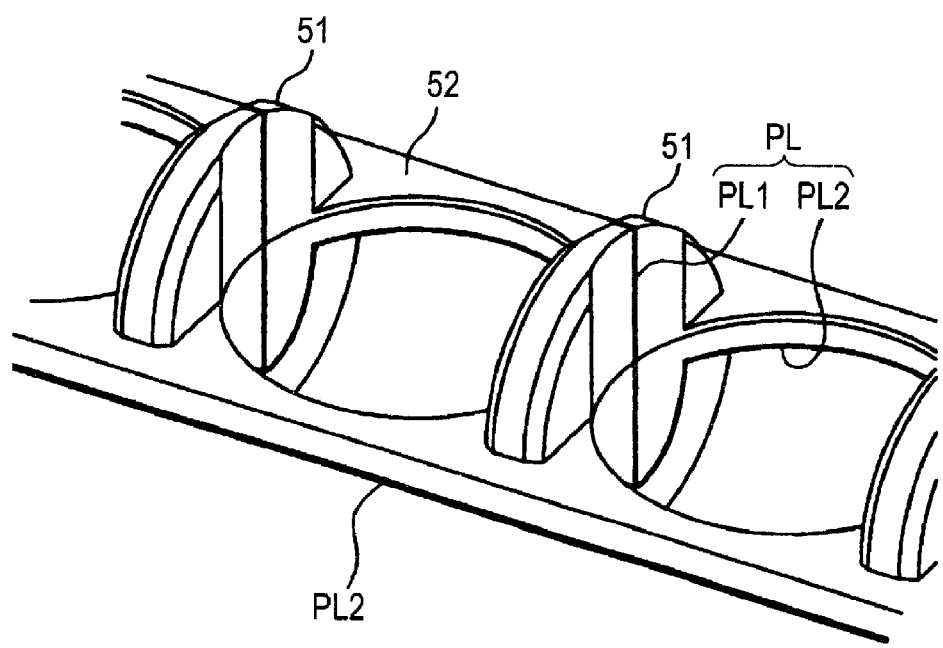
FIG. 8B is a perspective view showing a splitting portion of a metallic mold transferred onto the formed rolling element accommodating belt.
Figure 9A:
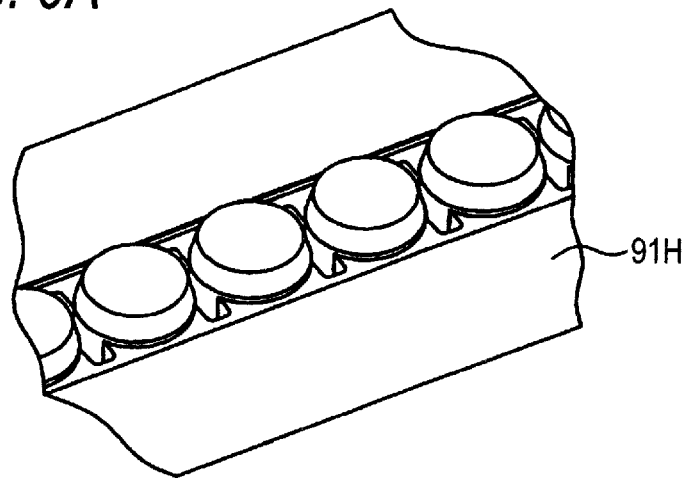
FIG. 9A is a view for explaining a metallic mold of Comparative Example and is corresponding to FIG. 5B of the first embodiment.
Figure 9B:
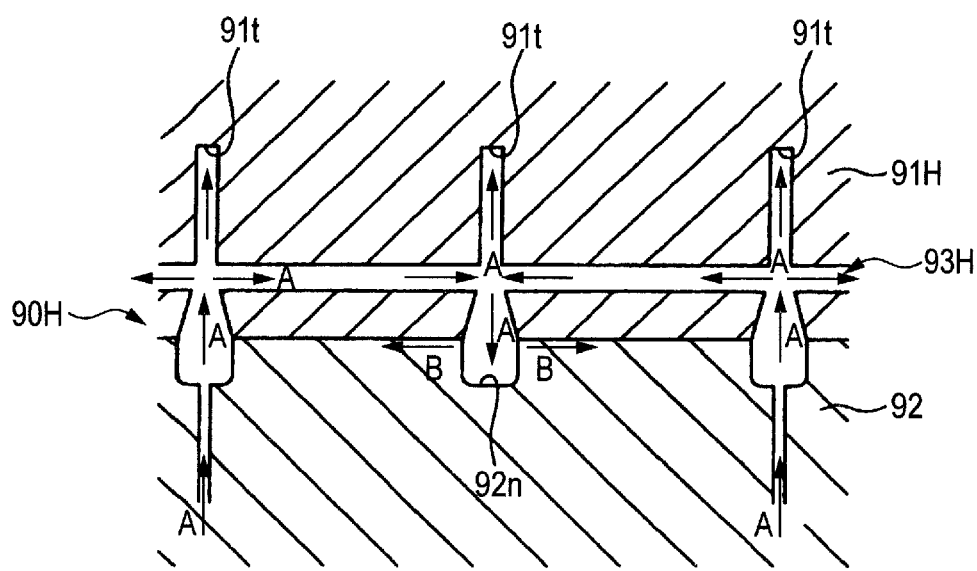
FIG. 9B is a view corresponding to FIG. 8A.

Next, appropriately referring to FIGS. 8 and 9, advantages of the above splitting structure will be explained in detail as follows. In this case, FIG. 9 is a schematic illustration for explaining a metallic mold of Comparative Example. Compared with the upper mold 91 of the present embodiment described before, the upper mold 91H of Comparative Example shown in FIG. 9A does not include a splitting structure (splitting position BL) composed in the longitudinal direction. Only at this point, the upper mold 91H of Comparative Example is different from the upper mold 91 of the present embodiment. Concerning this matter, refer to FIG. 9A. FIG. 9B is a view showing a model of the flow of resin when melted resin is injected into the product configuration portion 93H of the metallic mold 90H in which the upper mold 91H is combined with the lower mold 92. In this connection, in FIGS. 8A and 9B, an arrow indicated by the reference mark A shows an image of the flow of resin in the product configuration portion 93. An arrow indicated by the reference mark B shows an image of the flow of gas discharging from the joint portion between the upper mold 91 and the lower mold 92. An arrow indicated by the reference mark C shows an image of the flow of gas discharging from the joint portion (splitting position BL) between the split upper molds 91A and 91B.

Figure 9C:
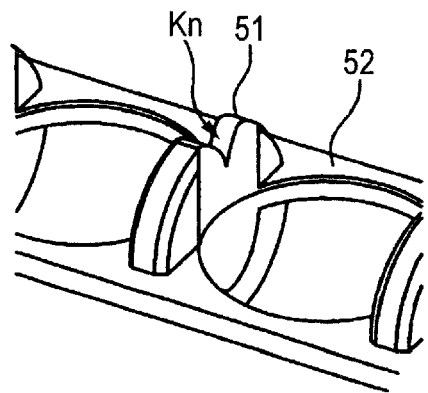
FIG. 9C is a view corresponding to FIG. 8B.

As described before, in the product configuration portion, in the neighborhood of the forward end portion of the resin flow, residual air or gas, which is generated by melting the resin material, stays. In Comparative Example, as shown in FIG. 9B, at the end portion forming position 91t at which the resin flow comes to a dead end, air or gas tends to stay. It is impossible for melted resin to sufficiently enter this portion in which air or gas is staying. Therefore, in the case of the upper mold 91H having no splitting structure in the longitudinal direction, the underfill portion Kn of resin tends to be generated at the end portion 51t of the spacer portion 51 of the product obtained in this way as shown in FIG. 9C. This underfill portion Kn of resin can be a cause of damaging the rolling element accommodating belt 50.

On the other hand, in the case of the metallic mold 90 of the present embodiment described before, the joint portion of the splitting position BL, at which the upper mold 91 is split in the longitudinal direction, can be made to function as a gas vent. Therefore, as shown in FIG. 8A, gas can be discharged from this splitting position BL. Especially, it is possible to prevent or suppress gas from staying in the end portion forming position 91t at which gas tends to stay. Due to the foregoing, melted resin can reach the end portion 51t which is a forward end portion of the spacer portion 51. Accordingly, the generation of the underfill portion of resin can be prevented at the time of forming.

According to this metallic mold 90, after the completion of forming the rolling element accommodating belt 50 in the metallic mold 90, when the rolling element accommodating belt 50 is pushed with the pushing pins 95 from a side on which the balls 46 accommodated in the rolling element accommodating portion 59 are allowed to move, the rolling element accommodating belt 50 can be released from the mold on the side on which no under-cut is formed. Accordingly, the rolling element accommodating belt 50 can be released from the mold without being given an extremely strong force. Since no under-cut is formed, the metallic mold 90 can be easily manufactured. The splitting portion (parting line) PL, which is transferred onto the rolling element accommodating belt 50 formed by the metallic mold 90 of the present embodiment, is formed by the vertical line PL1 formed along the releasing line at the center in the width direction of each spacer portion 51 and by the line PL2 which appears at the splitting position of the upper mold 91 and the lower mold 92 and passes through a boundary between the forward end portion of the inclined face portion 56a and the no-contact face 55 and is formed along the inner circumferential face of the ball accommodating hole 58 as shown by the bold solid line in FIG. 8 B.

According to the rolling element accommodating belt 50 described above, since it is manufactured with this metallic mold 90, the generation of the underfill portion Kn, which is caused in the forward end portion of the spacer portion 51 at the time of forming, can be suitably prevented or suppressed and a desired molding product can be formed. Due to the foregoing, it is possible to positively ensure a predetermined performance in which the balls 46 are smoothly circulated as a row of rolling elements 62 in the infinite circulating passage 28 while predetermined intervals are being maintained between the balls 46.

On this rolling element accommodating belt 50, the rolling element accommodating portions 59 for individually accommodating the balls 46 are defined by the spacer portions 51 and the connecting arm portions 52. These rolling element accommodating portions 59 are formed so that the balls 46 accommodated there can be allowed to move to the outer circumferential side in the inner and outer circumferential direction of the infinite circulating passage 28. Therefore, when the balls 46 are incorporated onto the rolling element accommodating belt 50, the balls 46 can be easily inserted into the rolling element accommodating portions 59 from the side on which the balls 46 to be accommodated are allowed to move.

Further, according to the linear guide 10 described before, since this rolling element accommodating belt 50 is provided, there is a low possibility of the occurrence of damage of the rolling element accommodating belt 50 caused by the underfill Kn of resin. Therefore, the quality of the rolling element accommodating belt 50 can be stabilized.

As explained above, according to the metallic mold 90 of the invention, an obstruction caused to the arrival of the melted resin at the end portion of the product configuration portion 93 caused by the gas staying there can be prevented or suppressed. Therefore, it is possible to obtain a desired rolling element accommodating belt 50 having no underfill portion Kn of resin. It is possible to provide the rolling element accommodating belt 50. It is also possible to provide the linear guide 10 having the rolling element accommodating belt 50.

In this connection, the metallic mold for manufacturing a rolling element accommodating belt, the rolling element accommodating belt for a linear guide apparatus and the linear guide apparatus of the present invention are not limited to the above specific embodiments. Modifications can be made without departing from the spirit and scope of the present invention.

For example, in the embodiment described above, the linear guide having balls is exemplarily explained as an embodiment of the metallic mold, the rolling element accommodating belt and the linear guide apparatus having the rolling element accommodating belt. However, the present invention is not limited to the above specific embodiment. For example, it is possible to apply the present invention to a roller guide having rollers.

For example, in the embodiment described above, the above rolling element accommodating portions 59 are formed so the balls 46 accommodated there can be allowed to move onto the outer circumferential side in the inner and the outer circumferential direction in the infinite circulating passage 28. However, the present invention is not limited to the above specific embodiment. In order to provide a structure in which releasing is conducted without giving an extremely strong force to the rolling element accommodating belt, the rolling element accommodating portion may be composed so that the rolling elements accommodated there can be allowed to move at least to one side in the inner and the outer circumferential direction of the infinite circulating passage. Due to the above structure, after the completion of forming the rolling element accommodating belt in the metallic mold, when the rolling element accommodating belt are pushed with the pushing pins from the side on which the rolling elements are allowed to move, the rolling element accommodating belt can be smoothly released from the side on which no under-cut is formed.

Concerning the metallic mold having a splitting structure of the present invention, the present invention is not limited to the above specific embodiment. When at least one of the upper mold 91 and the lower mold 92 has a splitting structure and the splitting structure is composed in such a manner that the splitting position BL is set at a position passing through a position where an end portion on at least one side in the inner and outer circumferential direction of the infinite circulating passage 28 of the spacer portion 51 is formed, it is possible to prevent or suppress the generation of the underfill portion of resin in the forward end portion of the spacer portion 51 at the time of forming.

Figure 10A:
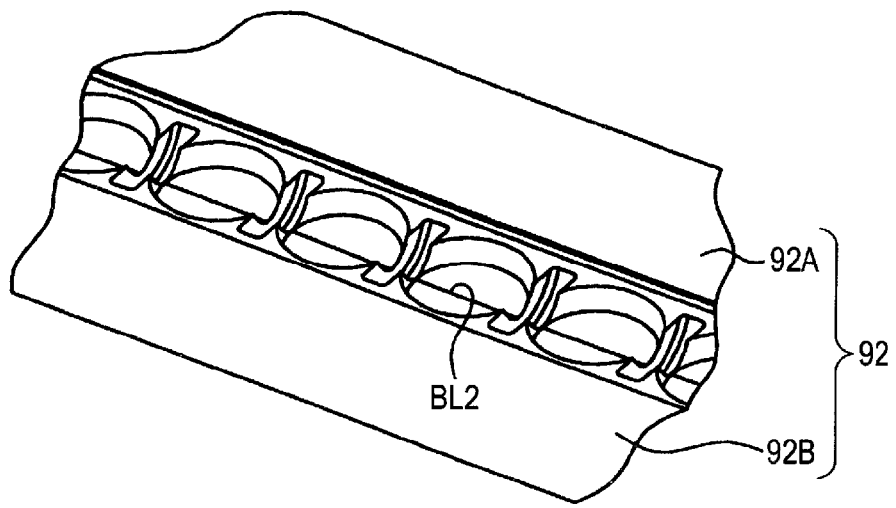
FIG. 10A is a view showing a product configuration portion of the lower mold of the metallic mold according to the first modification.
Figure 10B:
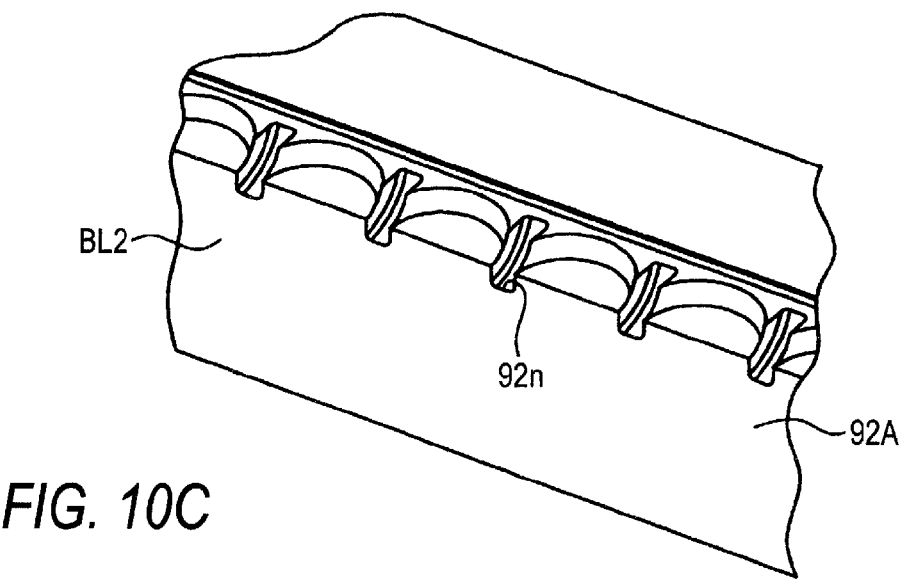
FIGS. 10B and 10C are views respectively showing an inner side and a viewer's side of the split lower mold.
Figure 10C:
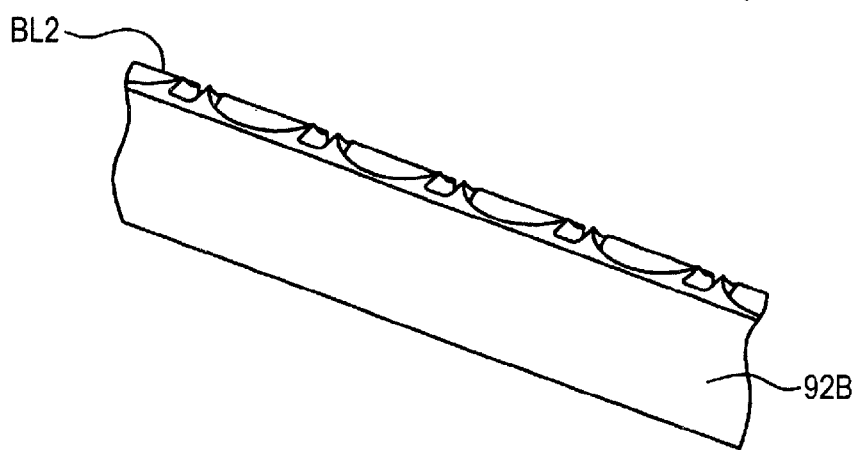

For example, the first modification is shown in FIG. 10.

As shown in FIG. 10, this first modification is different from the embodiment described before at the point that the lower mold 92, which is a stationary mold, is also split. That is, in the same manner as that of the upper mold 91 of the above embodiment, this lower mold 92 has a splitting structure in which the mold is split in the longitudinal direction and the splitting position BL2 is set at the center in the width direction in the longitudinal direction and the mold is split into two split molds 92A and 92B, wherein one mold is located on one side in the width direction of the splitting position BL2 and the other is located on the other side. The splitting position BL2 of the lower mold 92 is set at a position passing through a position 92n at which the end portion 51n (shown in FIG. 5C) on the inner circumferential side in the inner and outer circumferential direction of the infinite circulating passage 28 of the spacer portion 51 is formed.

According to the above structure, in addition to the action and advantage of the embodiment described before, even in the lower mold 92, the generation of the underfill Kn of resin in the end portion 51n on the inner circumferential side of the spacer portion 51 can be positively prevented. However, in the same manner as that of the structure of the embodiment described before, the splitting position of the upper mold 91 and the lower mold 92 is located close to the lower mold 92. Therefore, in the case where the end portion 51n on the inner circumferential side of the spacer portion 51 is located in the neighborhood of the lower mold 92, like the metallic mold 90 of the embodiment described above as compared with the end portion forming position 91t formed on the upper mold 91 side, it is formed on the lower mold 92 side. Gas can easily discharge from the position 92n which forms the end portion 51n on the inner circumferential side of the spacer portion 51. Therefore, it is unnecessary to positively split the lower mold 92, too. When the lower mold 92 is split, the structure of the metallic mold 90 becomes complicated, which raises the manufacturing cost of the metallic mold 90. Therefore, in the above embodiment, they attach importance to a reduction of the manufacturing cost and employ the structure in which the lower mold 92 is not split.

Figure 11A:
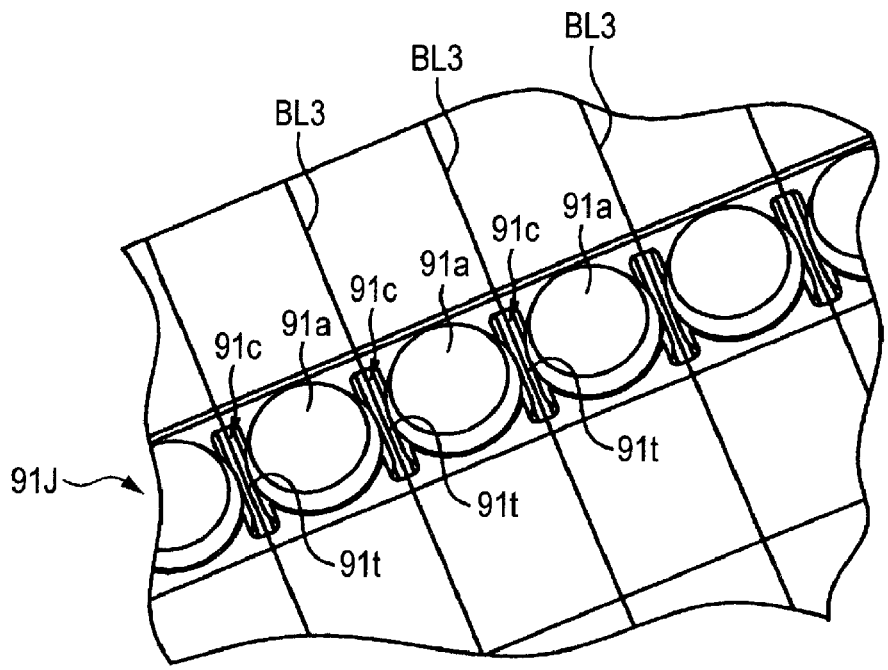
FIG. 11A is a perspective view showing a product configuration portion of the upper mold of the metallic mold according to the second modification.
Figure 11B:
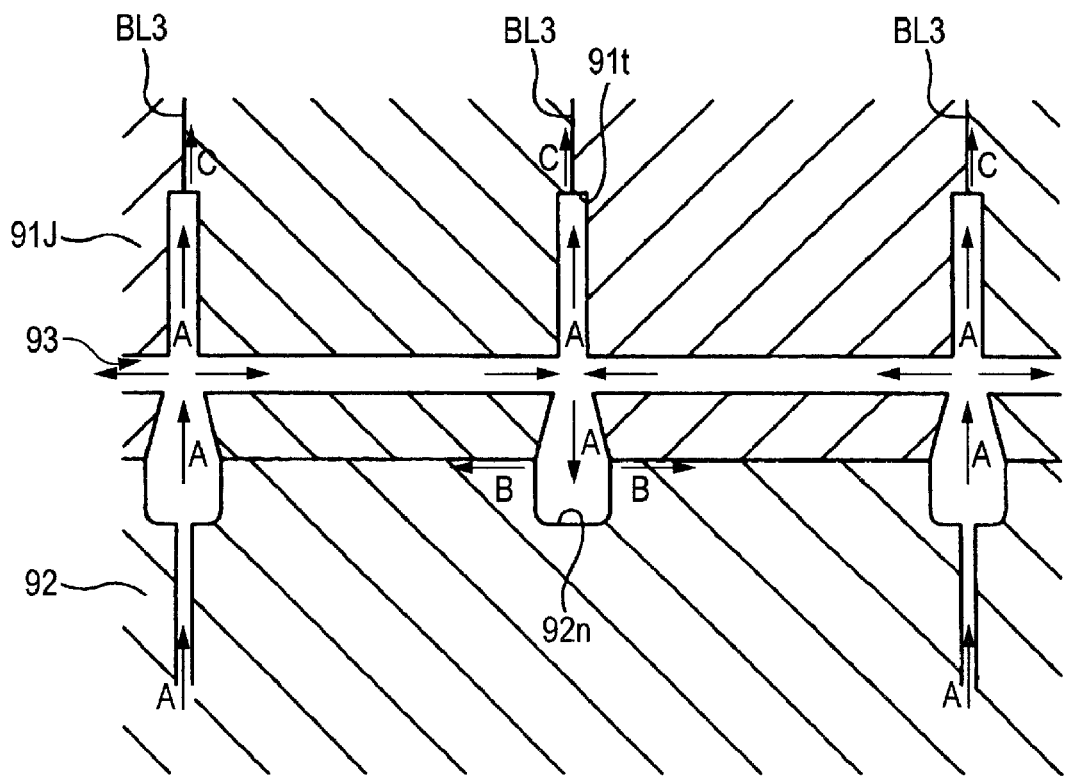
FIG. 11B is a view corresponding to FIG. 8A.
Figure 12:
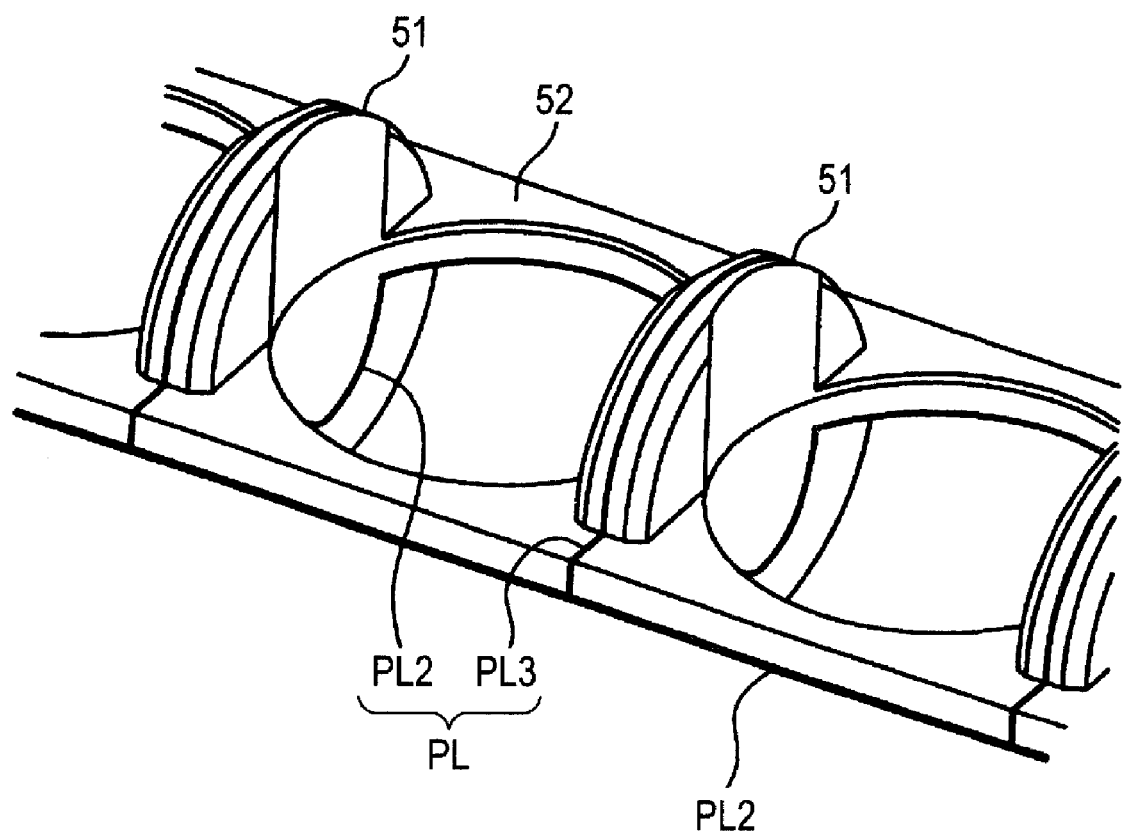
FIG. 12 is a perspective view showing a splitting portion of a metallic mold transferred onto a formed rolling element accommodating belt according to the second modification.

For example, FIGS. 11 and 12 show the second modification.

As shown in FIG. 11, the second modification is different from the embodiment described before at the following point. Instead of the splitting position BL in the embodiment described before, in the upper mold 91J, at the respective positions of the recess portions 91c for forming the spacer portions 51, the splitting position BL3 is set in a direction perpendicular to the longitudinal direction. That is, this upper mold 91J has the splitting structure in the direction perpendicular to the longitudinal direction and is split corresponding to the number of the spacer portions 51. The splitting position BL3 of this upper mold 91J is set at a position passing through the end portion forming position 91t for forming the end portion 51t (shown in FIG. 5C) on the outer circumferential side in the inner and outer circumferential direction of the infinite circulating passage 28 of the spacer portion 51.

Even in this structure, a joint portion of the splitting position BL3 can be made to function as a gas vent. Therefore, the generation of the underfill of resin in the end portion 51t on the outer circumferential side of the spacer portion 51 can be prevented or suppressed.

Since the number of the split molds is increased in the second modification, the structure becomes complicated. However, the second modification is advantageous in that no split face of splitting the metallic mold is provided on the contact face 56 of the rolling element accommodating belt 50. That is, there is no possibility that burr is generated on the contact face 56 coming into contact with the ball 46 which is a rolling element. Therefore, this structure is advantageous in that the ball 46 and the rolling element accommodating belt 50 are stably contacted with each other. In this connection, as shown by a bold solid line in FIG. 12, the splitting position (parting line) PL of splitting the metallic mold transferred onto the rolling element accommodating belt formed by the metallic mold of the second modification is formed by the line PL3, which is formed in a direction perpendicular to the longitudinal direction in the spacer portion 51, and by the line PL2 which appears at the splitting position of the upper mold 91 and the lower mold 92 and passes through a boundary between the forward end portion of the inclined face portion 56a and the no-contact face 55 and is formed along the inner circumferential face of the ball accommodating hole 58.

Second Embodiment

Next, the second and third embodiment according to the sixth to eleventh aspect of the invention will be explained.

The basic constitution of the rolling element accommodation belt, the linear guide apparatus and the metallic mold are the same, the detailed explanation regarding the similar members will be omitted.

Figure 13A:
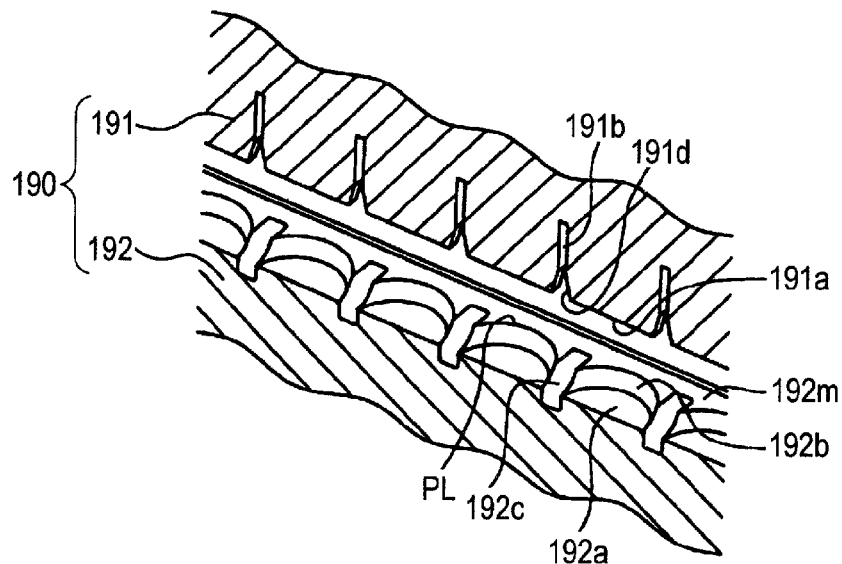
FIG. 13A is a perspective view of a metallic mold of the second embodiment of the present invention which has been cut in the longitudinal direction of a rolling element accommodating belt to be formed.
Figure 13B:
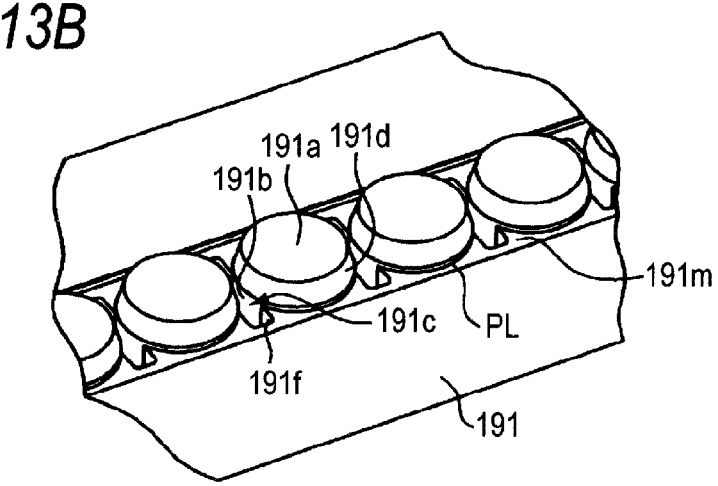
FIG. 13B is a perspective view of a product configuration portion of an upper mold of the metallic mold according to the second embodiment.
Figure 13C:
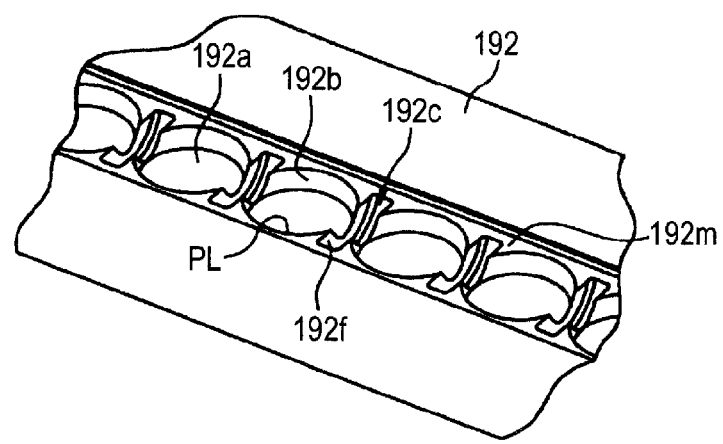
FIG. 13C is a perspective view of a product configuration portion of a lower mold of the metallic mold according to the second embodiment.

As shown in FIGS. 13B and 13C, a dividing position PL, at which the product configuration portions 193 of the upper mold 191 and the lower mold 192 are divided from each other, is set at a position which is a boundary between the non-contact face 155 and the contact face 156 of each spacer portion 151. As shown in FIG. 14, in this metallic mold 190, gates 194 for pouring melted synthetic resin into the product configuration portions 193 are provided in the lower mold 192. A necessary number of gates 194 are provided at positions corresponding to the end portion on the inner circumferential side of the spacer portion 151 to be formed. In the example shown in the drawing, the gates are provided every two spacer portions 151 apart. On the upper mold 191 side, a plurality of pushing pins 195 are provided. These pushing pins 195 are arranged being opposed to wide portions of the connecting arm portions 152 connecting the space portions 151, that is, these pushing pins 195 are arranged being opposed to peripheries of portions connecting the spacer portions 151 with the connecting arm portions 152. In this case, the pushing pins 195 are arranged on a side having the product configuration portions 193 on the side to allow the balls 146 to be moved of the upper mold 191 and the lower mold 192.

Figure 14B:
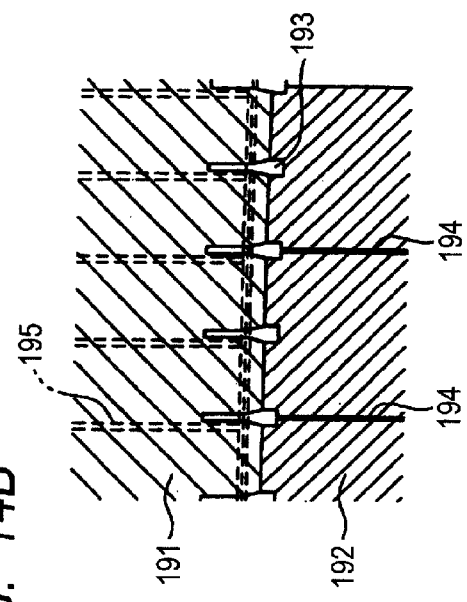
FIG. 14B is a schematic illustration for explaining a forming step executed by a metallic mold for manufacturing a rolling element accommodating belt of the present invention.
Figure 14D:
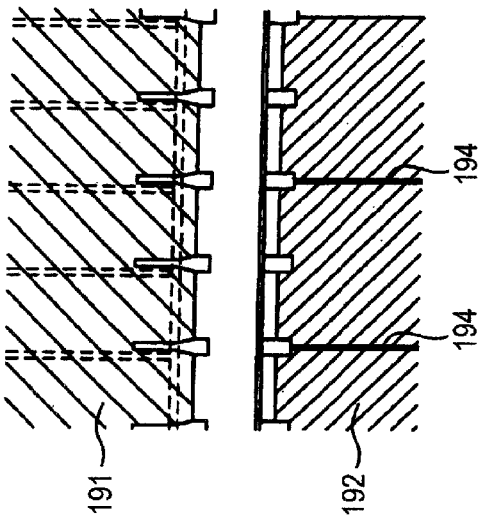
FIG. 14D is a schematic illustration for explaining a forming step executed by a metallic mold for manufacturing a rolling element accommodating belt of the present invention.
Figure 14A:
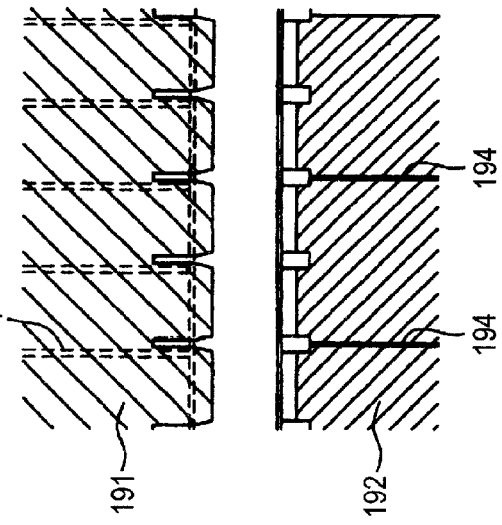
FIG. 14A is a schematic illustration for explaining a forming step executed by a metallic mold for manufacturing a rolling element accommodating belt of the present invention.
Figure 14C:
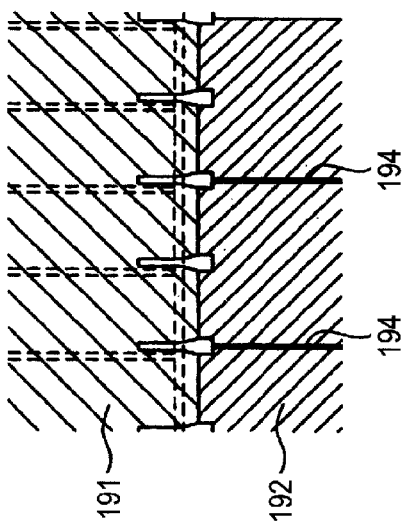
FIG. 14C is a schematic illustration for explaining a forming step executed by a metallic mold for manufacturing a rolling element accommodating belt of the present invention.
Figure 15:
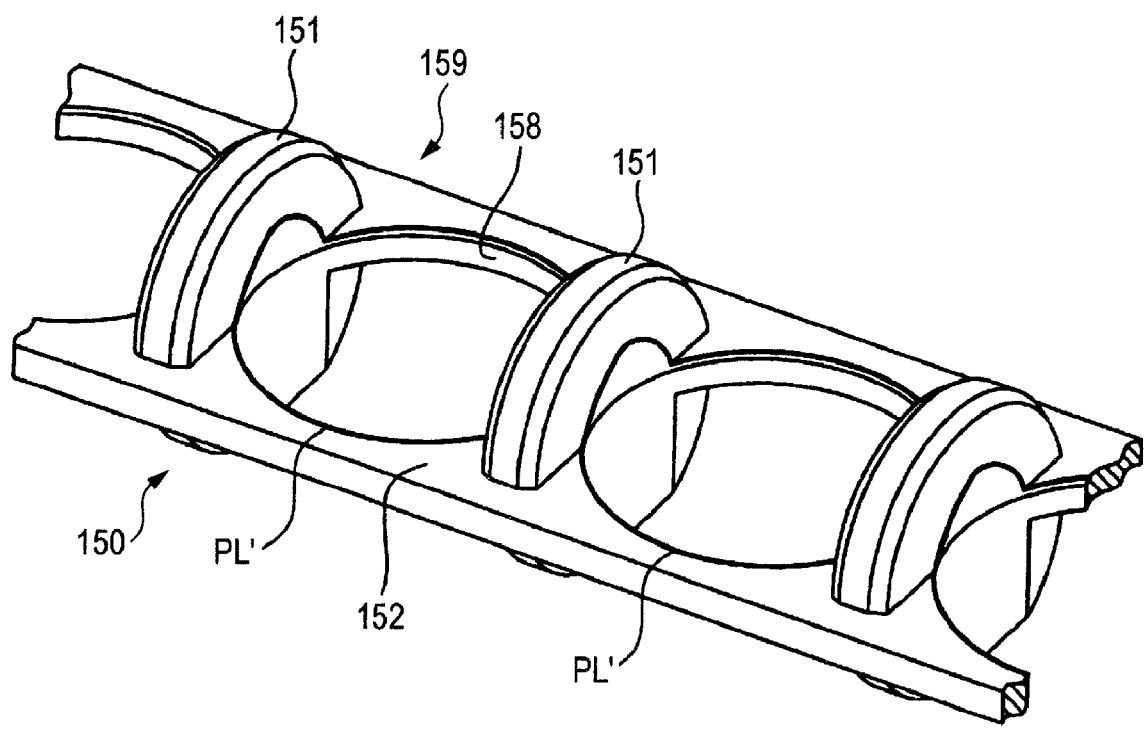
FIG. 15 is a schematic illustration for explaining a position of a dividing line on a rolling element accommodating belt of the present invention.

The manufacturing step executed by this metallic mold 190 is described as follows. As shown in FIG. 14A, the upper mold 191 and the lower mold 192 are respectively arranged at predetermined positions being opposed to each other. Next, as shown in FIG. 14B, the upper mold 191 is moved downward so as to make the upper mold 191 and the lower mold 192 tightly come close to each other at a predetermined opposing position. Next, as shown in FIG. 14C, melted synthetic resin is injected from the gates 194, which are arranged in the lower mold 192, into the product configuration portions 193. Next, after the injected synthetic resin has been solidified, as shown in FIG. 14D, the upper mold 191 is moved upward so as to open the mold in the vertical direction. Then, by the pushing pins 195 arranged on the upper mold 191 side, the thus formed rolling element accommodating belt 150 is pushed out and picked up. In this way, the rolling element accommodating belt 150 described above can be manufactured. In this case, the dividing position PL, at which the upper mold 191 and the lower mold 192 are divided from each other, is located at the boundary between the non-contact face 155 and the contact face 156 of each spacer portion 151. Therefore, as shown in FIG. 15, on the thus formed rolling element accommodating belt 150, a dividing line PL' is formed on the boundary between the non-contact face 155 and the contact face 156 of each spacer portion 151.

Next, actions and advantages of the rolling element accommodating belt 150 and the linear guide 110 will be explained below.

In the thus composed linear guide 110, when the slider 116 is relatively moved in the axial direction of the guide rail 112 while the balls 146 are rolling in the infinite circulating passage 128, the rolling element accommodating belt 150 is also moved in the infinite circulating passage 128 together with the balls 146. At this time, in the infinite circulating passage 128, the spacer portion 151 of the rolling element accommodating belt 150 pushes the ball 146 located in the front in the moving direction. Further, the ball 146 pushes the spacer portion 151 located in the front in the moving direction. Due to the foregoing, the entire rolling element row 162 circulates in the infinite circulating passage 128. The rolling element row 162 is moved in the opposite direction to the slider 116 in the rolling element passage 126. The rolling element row 162 enters from one end portion of the rolling element passage 126 into one direction changing passage 124 so that the moving direction of the rolling element row 162 can be changed. The rolling element row 162 enters from the direction changing passage 124 into the rolling element return passage 120 and moves in the same direction as that of the slider 116. The rolling element row 162 enters into the other direction changing passage 124 so that the moving direction can be changed again. Then, the rolling element row 162 returns to the rolling element passage 126. The above circulation of the rolling element row 162 can be repeated.

According to this linear guide 110, in the infinite circulating passage 128, the spacer portions 151 are interposed between the balls 146. Therefore, the balls 146 are not directly contacted with each other. Accordingly, it is possible to prevent the generation of noise and abrasion caused when the balls 146 rub each other. The spacer portions 151 are connected to each other by the connecting arm portions 152 so that the rolling element accommodating belt 150 can be composed. Therefore, while the balls 146 are maintaining predetermined intervals, the rolling element row 162 can be smoothly circulated in the infinite circulating passage 128.

According to this linear guide 110, the connecting arm portion 152 of each rolling element accommodating belt 150 is engaged with the guide groove 160. Therefore, it is possible to prevent each spacer portion 151 from falling down in the rolling element passage 126. Further, it is possible to prevent an arrangement of the rolling element row 162 from being disturbed, that is, it is possible to prevent a smooth movement of the rolling element row 162 from being obstructed. Since the connecting arm portion 152 of the rolling element accommodating belt 150 is guided by the infinite circulating passage 128 along the guide groove 160, deviation of the rolling element accommodating belt 150 is restricted while it is moving. Further, deviation of the ball 146 held between the connecting arm portions 152 of the rolling element accommodating belt 150 is also restricted. Therefore, the entire rolling element row 162 can be accurately, smoothly moved in the infinite circulating passage 128.

Further, according to this linear guide 110, the face 154 of the spacer portion 151 of the rolling element accommodating belt 150 directed to the adjacent ball 146 side includes: a non-contact face 155 which is not contacted with the adjacent ball 146; and a contact face 156 having a portion which is contacted with the adjacent ball 146. The dividing position PL, at which the product configuration portions (cavities) 193 of the upper mold 191 and the lower mold 192 are divided, is located on the boundary between the non-contact face 155 and the contact face 156 of each spacer portion 151. Therefore, with respect to the peripheral edge portion of the spacer portion 151 and with respect to the contact face 156 having a portion coming into contact with the ball 146, the rolling element accommodating belt 150 can be composed without providing the dividing line PL' of the metallic mold.

Therefore, in the case of this rolling element accommodating belt 150, even in the case where burr is generated in the portion of the dividing line PL' corresponding to the dividing position PL of the joint portion of the metallic mold 190, the burr can be prevented or suppressed from being rubbed on the inner circumferential wall of the infinite circulating passage 128 and the burr can be also prevented from being hooked on the inner circumferential wall. Further, the contact face 156, which is a face to be contacted with the ball 146, and the ball 146 can be stably contacted with each other. Therefore, according to this linear guide 110, even when burr is generated, the rolling element accommodating belt 150 can be smoothly circulated. When countermeasures are taken in order to prevent the generation of burr, it is possible to mitigate the degree of enhancing the accuracy of the joint portion of the metallic mold 190. It is also possible to mitigate the degree of controlling the forming condition. Therefore, the manufacturing cost can be reduced.

According to this linear guide 110, on the rolling element accommodating belt 150, the non-contact face 155 of each spacer portion 151 is formed on a plane in a direction perpendicular to the alignment direction in the infinite circulating passage 128. Therefore, when a releasing direction of the upper mold 191 and the lower mold 192 is set in the direction in which the non-contact face 155 is formed, releasing can be easily executed.

Further, according to this linear guide 110, by the spacer portion 151 and the connecting arm portion 152, the rolling element accommodating portion 159 for accommodating each ball 146 is defined. This rolling element accommodating portion 159 is composed so that the ball 146 accommodated there can be allowed to move to the outer circumferential side in the circumferential direction of the infinite circulating passage 128. Due to the above structure, when the rolling element accommodating belt 150 is pushed with a pushing pin 195 from a side on which the rolling elements 46 are allowed to move after the rolling element accommodating belt 150 has been formed in the metallic mold 190, it is possible to release the rolling element accommodating belt from a side on which no undercut is formed. Therefore, releasing can be conducted without giving an extremely strong force to the rolling element accommodating belt 150. Since no undercut portion is formed, the metallic mold 190 can be easily manufactured.

Third Embodiment

Next, the third embodiment of the present invention will be explained below. In this connection, the third embodiment is different from the second embodiment only in the structure of the rolling element accommodating belt. Other points of the third embodiment are the same as those of the second embodiment. Therefore, only the different point is explained and other points are omitted here.

As shown in FIG. 16, in the case of the rolling element accommodating belt 150B of the third embodiment, both faces of the contact face 156B of the spacer portion 151 are formed into shapes by which the balls 146 can be restricted in the directions of the surface side and the back side of the infinite circulating passage 128. This point is different from the second embodiment explained before.

Figure 16A:
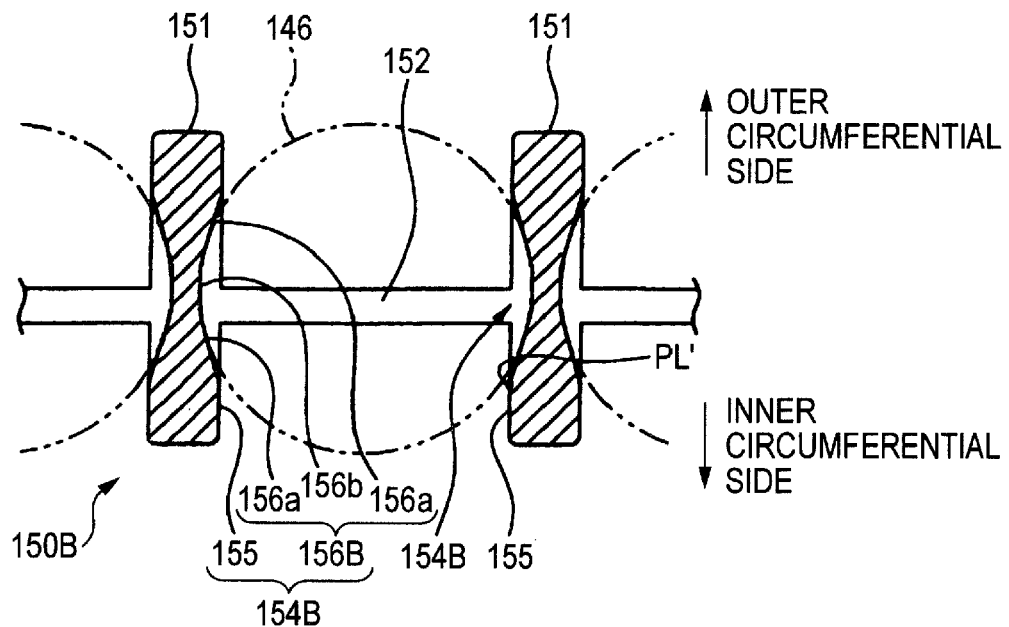
FIG. 16A is a view for explaining a linear guide of the third embodiment corresponding to FIG. 4C of the second embodiment.
Figure 16B:
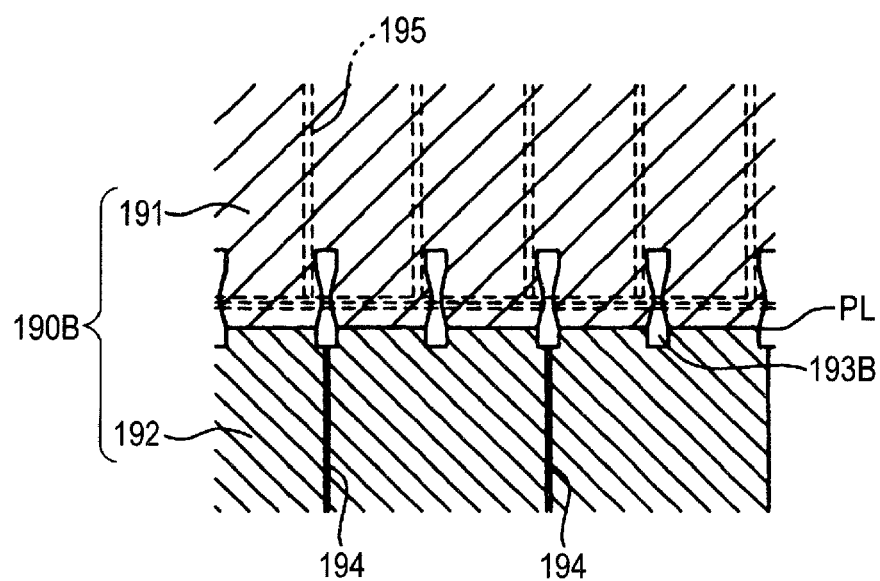
FIG. 16B is a view for explaining a linear guide of the third embodiment corresponding to FIG. 14B.
Figure 17:
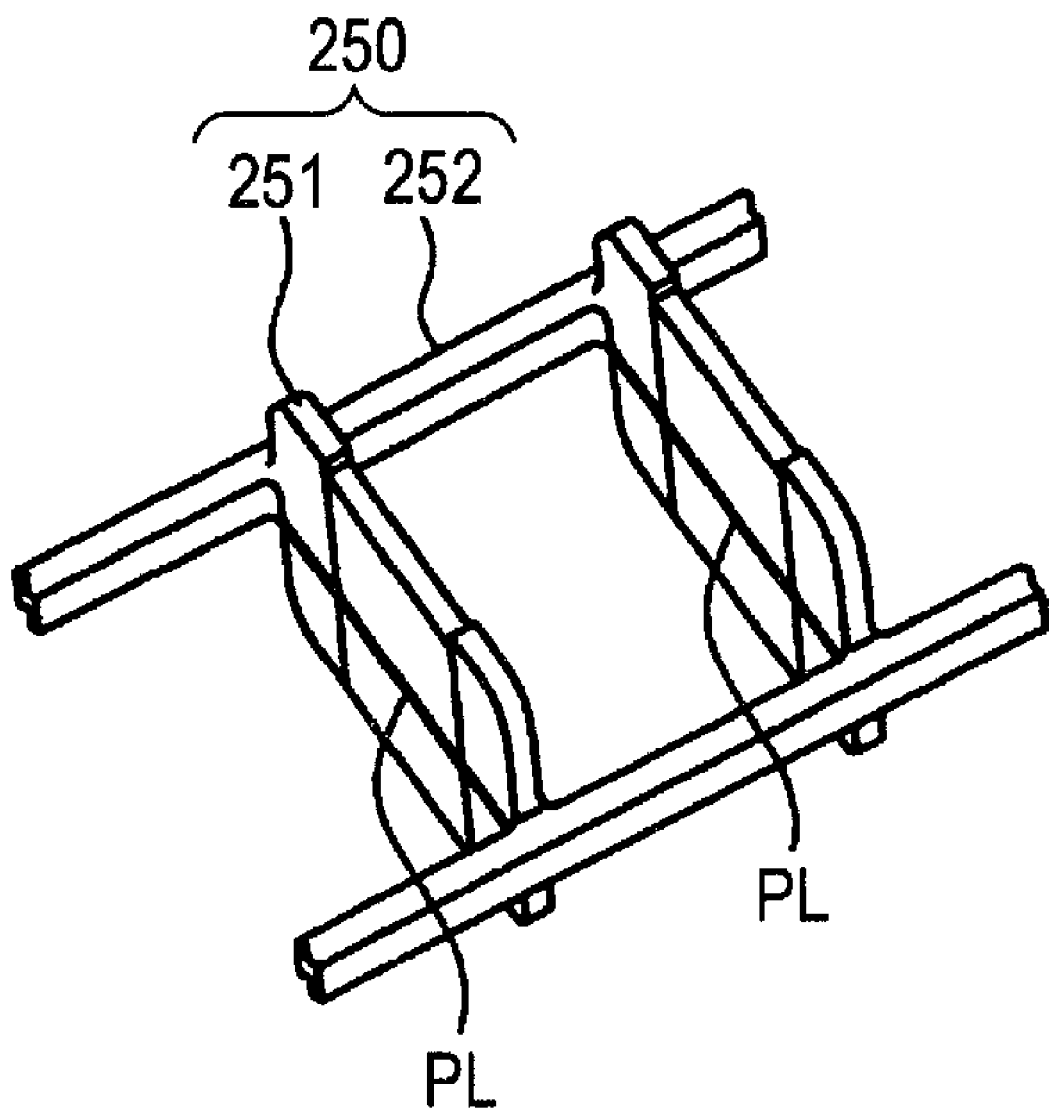
FIG. 17 is a schematic illustration for explaining an example of a position of a dividing line between an upper mold and a lower mold of a conventional rolling element accommodating belt.

As the structure is shown in detail in FIG. 16A, the face 154B of the spacer portion 151 directed to the side of the adjacent ball 146 has a contact face 156B on which the inclined face portion 156a, which is composed of a concave conical face, is respectively formed on the inner and the outer circumferential side of the infinite circulating passage 128. Between both the inclined face portions 156a on the inner and the outer circumferential side, a short plane portion 156c connecting the upper and the lower inclined face portion 156a is provided.

Even in the above structure, according to this rolling element accommodating belt 150B, in the same manner as that of the second embodiment, when the dividing position PL, at which the product configuration portions (cavities) 193 of the upper mold 191 and the lower mold 192 are divided, is set at the non-contact face 155 or at the boundary between the non-contact face 155 and the contact face 156, with respect to the peripheral edge portion of the spacer portion 151 and with respect to the contact face 156 having a portion coming into contact with the ball 146, the rolling element accommodating belt 150B can be composed without forming the dividing line PL' of the metallic mold 190. Accordingly, even in the case where burr is generated, the rolling element accommodating belt 150B can be smoothly circulated. In this connection, in the example shown in FIG. 16B, the dividing position PL, at which the upper mold 191 and the lower mold 192 are divided, is set so that the dividing line PL' can be formed on the boundary between the non-contact face 155 and the contact face 156. In the case of this third embodiment, undercut is formed. Therefore, when the rolling element accommodating belt is picked up from the metallic mold 190B, it is necessary to forcibly push out it with the pushing pins 195.

In the structure of this third embodiment, both sides of the contact face 156B of the spacer portion 151 restrict the ball 146 in the directions of the surface side and the back side of the infinite circulating passage 128. Accordingly, when the balls 146 have been once incorporated onto the rolling element accommodating belt 150B, the balls 146 seldom fall off. Therefore, this structure is advantageous at the time of storage and conveyance.

As explained above, according to the rolling element accommodating belts 150, 150B and the linear guide 110 provided with the rolling element accommodating belts 150, 150B, even when burr is generated, the rolling element accommodating belts 150, 150B can be smoothly circulated.

In this connection, the rolling element accommodating belt for a linear guide apparatus and the linear guide apparatus of the present invention are not limited to the above specific embodiments. Modifications can be made without departing from the spirit and scope of the present invention.

For example, in the embodiments described above, as an embodiment of the linear guide apparatus having the rolling element accommodating belt of the present invention, the linear guide having balls has been explained before. However, the present invention is not limited to the above specific example. For example, the present invention can be applied to a roller guide having rollers.

For example, in the second embodiment described above, the rolling element accommodating portion 159 is composed so that the ball 146 accommodated there can be allowed to move to the outer circumferential side in the circumferential direction of the infinite circulating passage 128. However, the present invention is not limited to the above specific embodiment. In order to compose the rolling element accommodating belt so that an extremely strong force can not be given to the rolling element accommodating belt at the time of releasing, the rolling element accommodating portion may be composed so that the rolling element accommodated there can be allowed to move at least to one side in the circumferential direction of the infinite circulating passage. Due to the above structure, after the rolling element accommodating belt has been formed in the metallic mold, when the rolling element accommodating belt is pushed with the pushing pins from the side on which the rolling element is allowed to move, the rolling element accommodating belt can be smoothly released from the side on which no undercut is formed.

For example, in the second embodiment described above, the dividing position PL, at which the product configuration portions 193 of the upper mold 191 and the lower mold 192 are divided, is located on the boundary of the non-contact face 155 and the contact face 156 of each spacer portion 151. However, the present invention is not limited to the above specific embodiment. For example, the dividing position PL may be located at the position of the non-contact face 155. Even in this structure, the rolling element accommodating belt 150 can be composed without forming the dividing line PL' of the metallic mold 190 with respect to the circumferential edge portion of the spacer portion 151 and with respect to the contact face 156 having the portion coming into contact with the ball 146. In this connection, in order to simplify the structure of the upper mold 191 and the lower mold 192, it is preferable that the dividing position PL of the upper mold 191 and the lower mold 192 is located on the boundary of the non-contact face 155 and the contact face 156 and that the rolling element accommodating belt 150 is formed by setting the dividing line PL' on the boundary of the non-contact face 155 and the contact face 156.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A rolling element accommodating belt for a linear guide apparatus, which has an infinite circulating passage in which a plurality of rolling elements are rolling and circulating, the rolling element accommodating belt comprising:

a spacer portion interposed between the rolling elements adjacent to each other; and
a connecting arm portion for connecting the spacer portions to each other, wherein
the rolling elements are aligned in the infinite circulating passage in an alignment direction,
a face of each spacer portion directed to the rolling element comprises:
a non-contact face which does not contact with the rolling element; and
a contact face which is hollow with respect to the non-contact face and contacts with the rolling element,
the rolling element accommodating belt is manufactured by an injection molding by using a metallic mold comprising a product configuration portion formed between an upper mold and a lower mold, and
a dividing line between the upper mold and the lower mold is formed on the non-contact face of the spacer portion or on a boundary between the non-contact face and the contact face so that the rolling elements can be smoothly circulated.

2. The rolling element accommodating belt according to claim 1, wherein
the non-contact face is formed of a plane perpendicular to the alignment direction in the infinite circulating passage.

3. The rolling element accommodating belt according to claim 1, wherein
rolling element accommodating portions for individually accommodating the rolling elements are defined by the spacer portions and the connecting arm portions, and
the rolling element accommodating portions are formed so that the accommodated rolling elements is allowed to move to at least one side in the inner and the outer circumferential direction of the infinite circulating passage.

4. A linear guide apparatus comprising a rolling element accommodating belt according to claim 1.

5. A metallic mold for manufacturing the rolling element accommodating belt according to claim 1 by injection molding, the metallic mold comprising:
an upper mold; and
a lower mold, wherein
a product configuration portion for forming the rolling element accommodating belt is formed between the upper mold and the lower mold, and
the upper mold and the lower mold are divided on a position where the non-contact face of the spacer portion or on a boundary between the non-contact face and the contact face is formed.

6. The rolling element accommodating belt according to claim 1, wherein the dividing line is formed on the boundary between the non-contact face and the contact face.

* * * * *